(12) United States Patent
Yamaguchi et al.

(10) Patent No.: US 7,938,096 B2
(45) Date of Patent: May 10, 2011

(54) ENGINE START CONTROL DEVICE AND METHOD

(75) Inventors: Kazuhi Yamaguchi, Kobe (JP); Yoshimi Takatori, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 741 days.

(21) Appl. No.: 11/920,685

(22) PCT Filed: May 16, 2006

(86) PCT No.: PCT/JP2006/309733
§ 371 (c)(1),
(2), (4) Date: Nov. 19, 2007

(87) PCT Pub. No.: WO2006/123654
PCT Pub. Date: Nov. 23, 2006

(65) Prior Publication Data
US 2010/0116236 A1 May 13, 2010

(30) Foreign Application Priority Data
May 18, 2005 (JP) .................................. 2005-145088

(51) Int. Cl.
*F02N 11/08* (2006.01)
(52) U.S. Cl. .................................................. 123/197.4
(58) Field of Classification Search ............... 123/179.3, 123/179.4
See application file for complete search history.

(56) References Cited

U.S. PATENT DOCUMENTS

| | | | | |
|---|---|---|---|---|
| 6,104,157 | A | 8/2000 | Kramer et al. | |
| 6,148,781 | A * | 11/2000 | Boegner et al. | 123/179.3 |
| 6,308,674 | B1 | 10/2001 | Ruehle et al. | |
| 6,456,034 | B1 | 9/2002 | Vilou | |
| 7,665,438 | B2 * | 2/2010 | Hirning et al. | 123/179.3 |
| 2002/0014216 | A1 * | 2/2002 | Boegner et al. | 123/179.3 |
| 2007/0227489 | A1 * | 10/2007 | Ando | 123/179.3 |
| 2007/0246012 | A1 * | 10/2007 | Ando | 123/406.13 |

FOREIGN PATENT DOCUMENTS

| | | |
|---|---|---|
| JP | A 11-048908 | 2/1999 |
| JP | A 11-190266 | 7/1999 |
| JP | A 2000-097137 | 4/2000 |
| JP | A 2000-145491 | 5/2000 |
| JP | A 2001-525037 | 12/2001 |
| JP | A 2003-247478 | 9/2003 |

* cited by examiner

*Primary Examiner* — Hai H Huynh
(74) *Attorney, Agent, or Firm* — Oliff & Berridge, PLC

(57) ABSTRACT

An engine start control device includes a starter energizing circuit that has two transistors connected in series and energizes a starter relay, and an idling stop ECU that performs energization control to turn on a transistor and energizes the starter relay when automatic start requirements are satisfied. Prior to the energization control, the idling stop ECU sequentially performs OFF failure detection and ON failure detection in one of the transistors, and OFF failure detection and ON failure detection in the other one of the transistors. The failure detection is aborted when failure is found. With this structure, ON failure in the two transistors can be detected with accuracy, and inadvertent driving of the starter can be prevented.

14 Claims, 29 Drawing Sheets

FIG. 10

| PATTERN \ MONITOR | MONITOR MV1 | MONITOR MV2 |
|---|---|---|
| PATTERN 1 (Tr1:OFF, Tr2:OFF) | Vcc/2 | OFF |
| PATTERN 2 (Tr1:OFF, Tr2:ON) | GND | OFF |
| PATTERN 3 (Tr1:ON, Tr2:OFF) | Vcc | OFF |
| PATTERN 4 (Tr1:ON, Tr2:ON) | Vcc | ON |

ENGINE START CONTROL DEVICE AND METHOD

FIELD OF THE INVENTION

The present invention relates to an engine start control device and method suitable for starting an engine to be subjected to idling stop control by automatically restarting the engine when predetermined requirements are satisfied after an idling stop of the engine.

BACKGROUND OF THE INVENTION

There has been so-called idling stop control to be performed in an engine mounted on a vehicle. In the idling stop control, the engine is stopped when predetermined stop requirements are satisfied, and is restarted when predetermined start requirements are satisfied. In this manner, the fuel consumption and the exhaust gas amount are reduced.

In the idling stop control operation, when automatic start requirements are satisfied, a starter relay for activating the starter of the engine is energized by a starter energizing circuit, so as to automatically restart the engine (see Reference 1, for example).

The starter energizing circuit normally has two transistors connected in series between the starter relay and the power supply. When the automatic start requirements are satisfied, the starter energizing circuit turns on the two transistors (makes the two transistors conductive) at the same time, so as to energize the starter relay. With the two transistors being provided in series, continuous energization of the starter relay can be prevented by turning off the other transistor, when one of the transistors has ON failure.

[Reference 1] Japanese Unexamined Patent Publication No. 2000-145491

DISCLOSURE OF THE INVENTION

Problems to be Solved by the Invention

If there is failure in the transistors of the above starter energizing circuit, the idling stop control cannot be performed. Therefore, it is necessary to check the transistors for failure when the engine is first activated or while the vehicle is moving before entering the idling stop control mode.

However, in a case where one of the two transistors has ON failure (failure in a conductive state), both transistors become on when the other transistor is turned on, and the starter relay is energized. As a result, the starter is activated against the user's intention. When the starter is activated against the user's intention while the vehicle is moving, a noise peculiar to startup of the starter is caused, and discomfort and uncertainty are caused to the user.

The present invention has been made in view of the above circumstances, and an object of the present invention is to provide an engine start control device and method by which inadvertent driving of the starter due to ON failure of a transistor can be restrained or prevented in a case where the transistors of the starter energizing circuit are checked for failure in an idling stop control operation.

Means to Solve the Problems

An engine start control device as a first aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; and failure detecting means that drives each of the transistors to check for failure. The failure detecting means characteristically detects the state of each of the transistors prior to the check for failure in each of the transistors, and the failure detecting means aborts the failure detection when the detection result indicates an error.

With this structure, the state of each of the transistors is checked in advance, and, only when each of the transistors is in a normal state, the transistors are driven so that failure detection is performed. Accordingly, inadvertent driving of the starter can be prevented or restrained.

An engine start control device as a second aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; and a failure detecting means that drives each of the transistors to check for failure, and detects a state of each of the transistors prior to the check for failure in each of the transistors. The failure detecting means aborts the failure detection when at least one of the transistors is in a conductive state.

An engine start control device as a third aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; and a failure detecting means that drives each of the transistors to check for failure, and performs failure detection in the transistors while the vehicle is running.

An engine start control device as a fourth aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; a failure detecting means that drives each of the transistors to check for failure; a failure detecting circuit that is allowed to have the starter energizing circuit connected thereto; and a circuit switching circuit that switches the connection destination of the starter energizing circuit from the starter relay to the failure detecting circuit before failure detection is performed by the failure detecting means.

An engine start control device as a fifth aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; a transistor state detecting means that detects the states of the transistors; and circuit disconnecting means that disconnects the starter energizing circuit from the starter relay when the detected states of the transistors indicate an abnormal state.

An engine start control device as a sixth aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; and a failure detecting means that drives each of the transistors to check for failure, and sequentially performs OFF failure detection and ON failure detection in one of the transistors and OFF failure detection and ON failure detection in the other transistor. The failure detecting means aborts the failure detection when failure is found.

With this structure, the OFF failure detection and the ON failure detection in one of the transistors and the OFF failure detection and the ON failure detection in the other transistor are sequentially performed, so that ON failure can be detected with accuracy. Also, the failure detection is aborted when failure is found. Thus, the problem of both transistors being turned on during the detection can be avoided.

In the above structure, the failure detecting means may maintain one of the transistors in an ON prohibited state, while checking the other one of the transistors for ON failure.

With this structure, after ON failure is found in one of the transistors, the other transistor is prevented from being turned on. Thus, the problem of both transistors being turned on can be avoided.

In the above structure, the failure detecting means may maintain both of the transistors in an ON prohibited state, while checking one of the transistors for OFF failure.

With this structure, any of the transistors is prevented from being turned on. Thus, even if ON failure is caused in the other transistor that is not being checked for OFF failure, the problem of both transistors being turned on can be avoided.

In the above structure, the failure detecting means may put one of the transistors in an ON prohibited state and abort the failure detection, when ON failure is found in the other one of the transistors.

With this structure, after ON failure is caused in one of the transistors, the other transistor is prevented from being turned on. Thus, the problem of both transistors being turned on can be avoided, and unnecessary detection is not performed.

An engine start control device as a seventh aspect of the present invention automatically stops an engine when automatic stop requirements are satisfied while the engine is on, and automatically restarts the engine when automatic start requirements are satisfied while the engine is off. This engine start control device is characterized by including: a starter energizing circuit that is provided between a power supply and a starter relay for activating a starter of the engine, includes at least two transistors connected in series, and energizes the starter relay; a failure detecting means that drives each of the transistors to check for failure; and a switching circuit that selectively switches the connection destination of the starter energizing circuit between the starter relay and a failure detecting circuit. In this structure, the failure detecting means determines whether the two transistors have failure while controlling the switching circuit to connect the starter energizing circuit and the failure detecting circuit. The failure detecting means controls the switching circuit to reconnect the starter energizing circuit and the starter relay when failure is not found.

With this structure, the starter energizing circuit is disconnected from the starter relay and is connected to the failure detecting circuit during the failure detection in the two transistors. Accordingly, the problem that both transistors are turned on due to ON failure of one of the transistors and the starter relay is energized to drive the starter against the user's intention can be prevented with certainty.

In the above structure, the failure detecting means may control the switching circuit to connect the starter energizing circuit and the failure detecting circuit, when determining that the starter relay is energized from the starter energizing circuit even though predetermined requirements are not satisfied while the two transistors are not being checked.

With this structure, when the starter relay is energized to drive the starter due to failure in the two transistors while detection is not being performed in the two transistors, the driving of the starter can be automatically stopped.

In the above structure, the failure detecting circuit may include a switching element that opens and closes a path connecting the switching circuit to a ground, and the failure detecting means may open the switching element to shut off the path when failure is found while the switching element is closed.

With this structure, when ON failure is found in both transistors while the starter energizing circuit is connected to the failure detecting circuit, the switching element is opened to cut off the path. Thus, unnecessary power consumption can be prevented.

By an engine start control method as an eighth aspect of the present invention, an engine is automatically stopped when automatic stop requirements are satisfied while the engine is on, and the engine is automatically restarted when automatic start requirements are satisfied while the engine is off. This engine start control method is characterized by comprising the step of checking a starter energizing circuit that is provided between a power supply and a starter relay for activating a starter of the engine, includes at least two transistors connected in series, and energizes the starter relay. In the checking step, OFF failure detection and ON failure detection in one of the transistors and OFF failure detection and ON failure detection in the other transistor are performed sequentially, and the failure detection is aborted when ON failure is found.

By an engine start control method as a ninth aspect of the present invention, an engine is automatically stopped when automatic stop requirements are satisfied while the engine is on, and the engine is automatically restarted when automatic start requirements are satisfied while the engine is off. This engine start control method is characterized by comprising the step of checking a starter energizing circuit that is provided between a power supply and a starter relay for activating a starter of the engine, includes at least two transistors connected in series, and energizes the starter relay. In the checking step, the detection is performed while the starter energizing circuit disconnected from the starter relay is connected to the failure detecting circuit, and the starter energizing circuit is reconnected to the starter relay when failure is not found.

Effects of the Invention

In accordance with the present invention, when the transistors of the starter energizing circuit are checked in an idling stop control operation, the problem of the starter being driven due to ON failure of the transistors can be restrained or avoided. Thus, users can be prevented from having a sense of discomfort or uncertainty.

BRIEF DESCRIPTION OF THE DRAWINGS

FIG. 10 shows the relations between the combinations of operation patterns of transistors in normal states and the monitor voltage values;

DESCRIPTION OF THE PREFERRED EMBODIMENTS

The following is a detailed description of preferred embodiments of the present invention, with reference to the accompanying drawings.

First Embodiment

Figure 1:
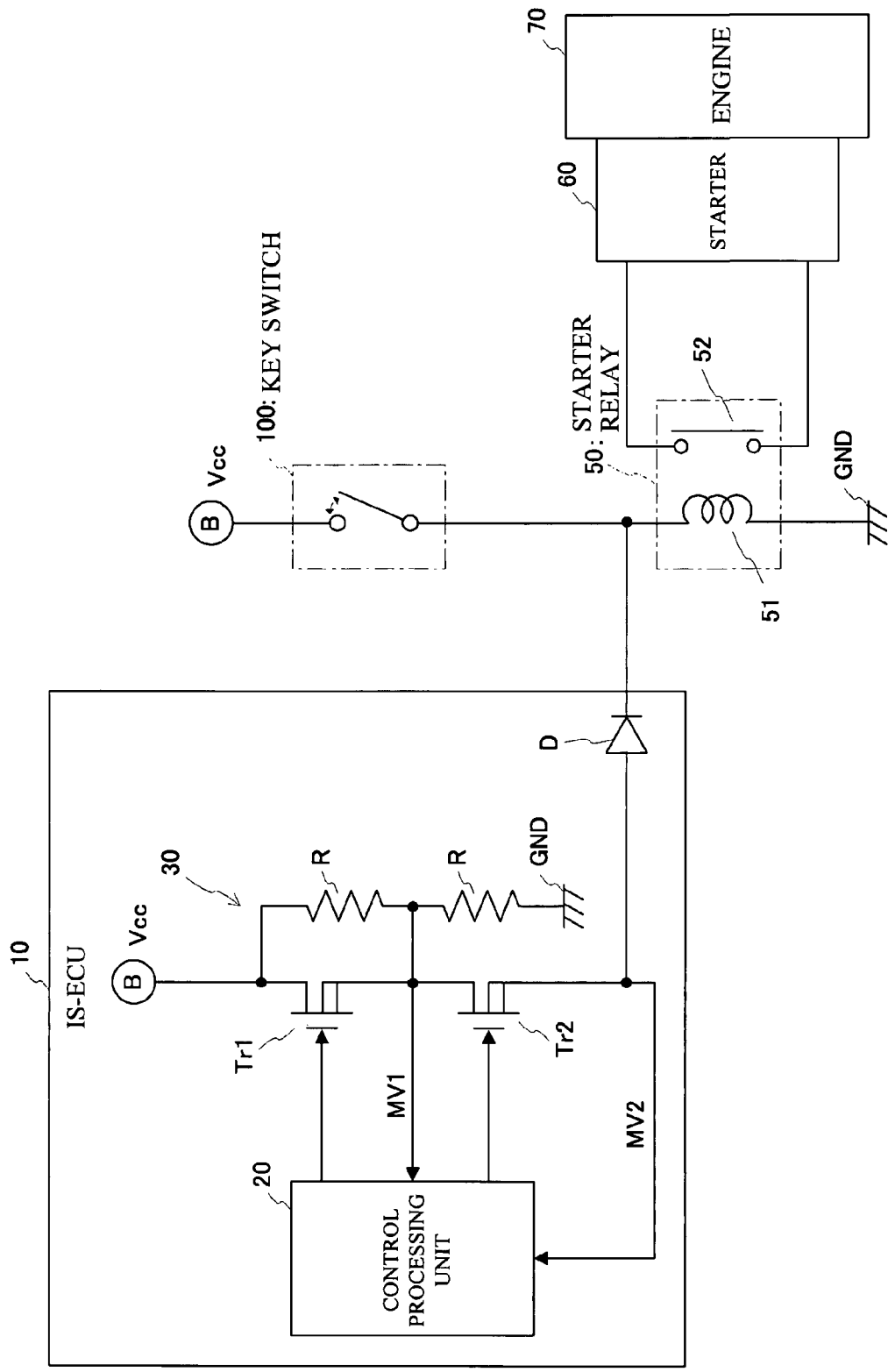
FIG. 1 shows the structure of an idling stop ECU in accordance with one embodiment of an engine start control device of the present invention.

FIG. 1 shows the structure of an idling stop ECU (hereinafter referred to as the IS-ECU) in accordance with one embodiment of an engine start control device of the present invention that is applied to an engine starter, and also shows the peripheral components of the IS-ECU.

In FIG. 1, an engine 60 is equipped with a starter 60 that rotates the crank shaft for a start. A starter relay 50 is connected to this starter 60.

The starter relay 50 is a switch for activating the starter 60, and includes a coil 51 and a relay contact point 52. One end of the starter relay 50 is connected to a ground GND, and the other end is connected to the output end of a starter energizing circuit 30 and a power supply B (via a key switch 100).

When the engine is started for the first time, the key switch 100 is turned on (becomes conductive) by a user operation. The starter relay 50 is then energized from the power supply B, and the starter relay 50 is turned on to drive the starter 60.

Meanwhile, the IS-ECU 10 performs an idling stop control operation to automatically stop the engine when automatic stop requirements are satisfied during an engine operation and to automatically restart the engine when automatic restart requirements are satisfied. When the engine is automatically restarted, the starter energizing circuit 30 energizes the starter relay 50 to drive the starter 60. The idling stop control is a known technique, and therefore, explanation of it is omitted here. It should be understood that the IS-ECU 10 may be either independently of or integrally with the engine ECU that controls the engine.

The IS-ECU 10 includes a control processing unit 10 as a controller and the starter energizing circuit 30.

The starter energizing circuit 30 is provided between the starter relay 50 and the power supply B of a power supply voltage Vcc. The starter energizing circuit 30 includes two transistors Tr1 and Tr2 connected in series, two resistors R for voltage dividing, and a diode D.

The transistors Tr1 and Tr2 are formed with MOSFETs, for example, and are turned on (become conductive) and turned off (opened) in accordance with an instruction from the control processing unit 10. When the transistors Tr1 and Tr2 are both turned on, the starter relay 50 (the coil 51) is energized from the power supply B via the diode D, to drive the starter 60.

The two resistors R are connected in series between the power supply B side of the transistor Tr1 and the ground GND, so that the power supply voltage Vcc is shared between the transistor Tr1 and the transistor Tr2. The relay point between the two resistors R is electrically connected to the relay point between the transistors Tr1 and Tr2. The two resistors R have a very large resistance value, and hardly allow a current to flow.

The control processing unit 20 is formed with hardware such as a processor and a memory, and necessary software. When the automatic stop requirements are satisfied in an idling stop control operation, the control processing unit 20 performs a control operation necessary for idling stop control by outputting a control instruction to turn on the transistors Tr1 and Tr2, so as to energize the starter relay 50, for example. Prior to the energization control to energize the starter relay 50, the control processing unit 20 checks the transistors Tr1 and Tr2 for failure.

A monitor voltage value MV1 of the relay point between the transistors Tr1 and Tr2 is input to the control processing unit 20, and a monitor voltage value MV2 of the transistor Tr2 on the side of the starter relay 50 is also input to the control processing unit 20. Based on the monitor voltage values MV1 and MV2, the control processing unit 20 determines whether there is failure in the transistors Tr1 and Tr2.

Figure 2:
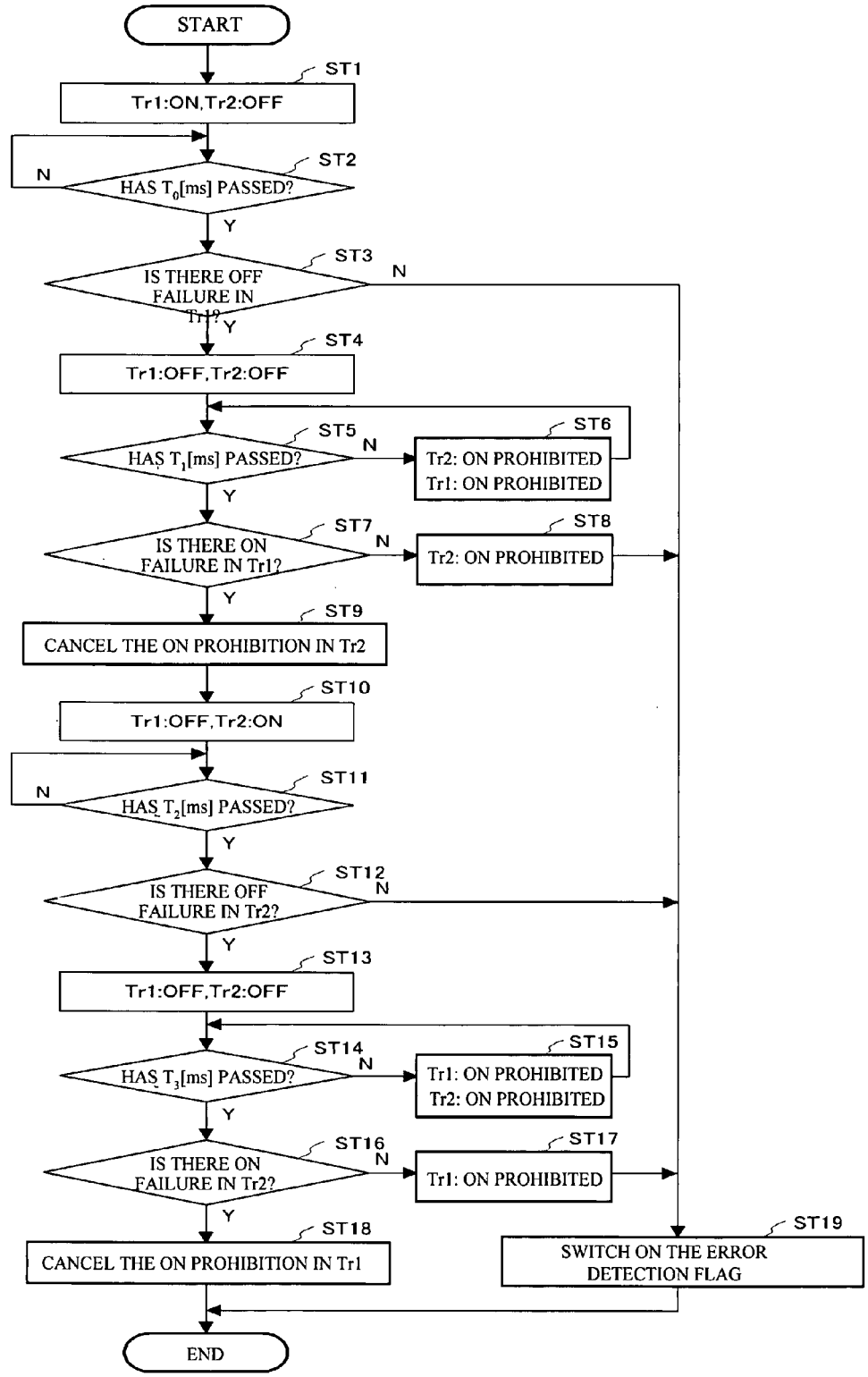
FIG. 2 is a flowchart showing an example of a failure detecting operation to be performed by the starter energizing circuit.
Figure 3:
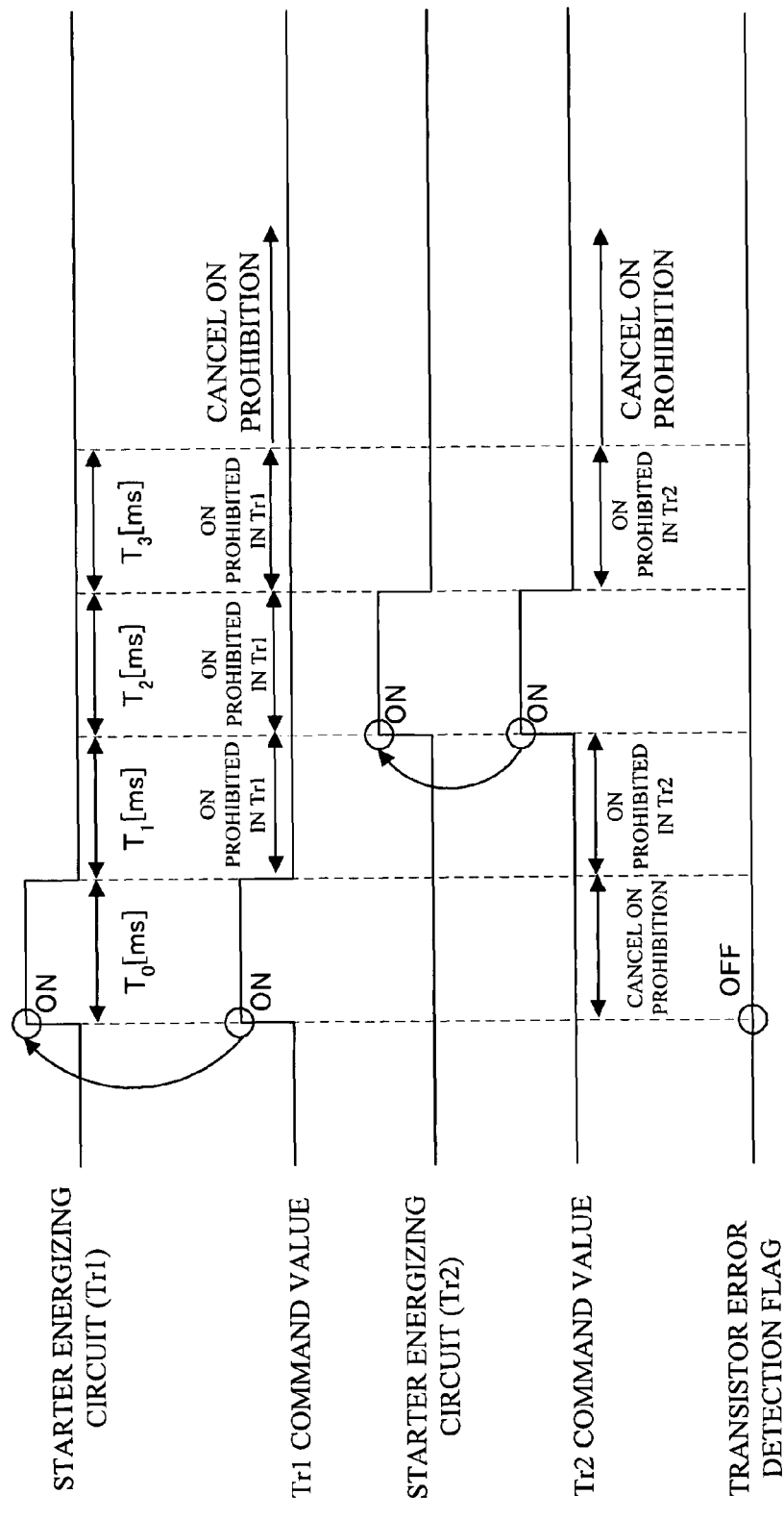
FIG. 3 is a timing chart of the signals observed in a case where the transistors Tr1 and Tr2 are both in a normal state.
Figure 4:
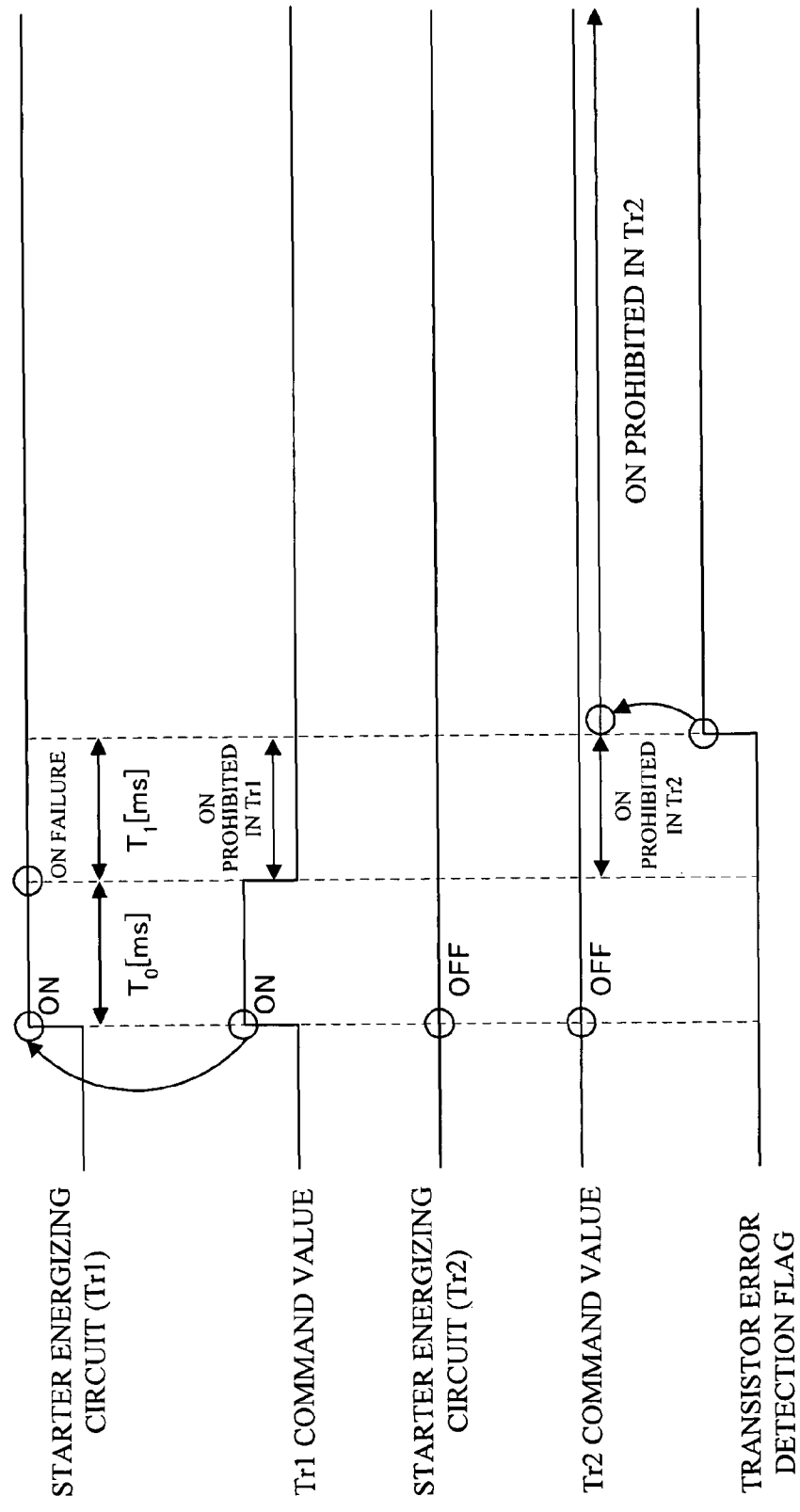
FIG. 4 is a timing chart of the signals observed in a case where the transistor Tr1 has ON failure.
Figure 5:
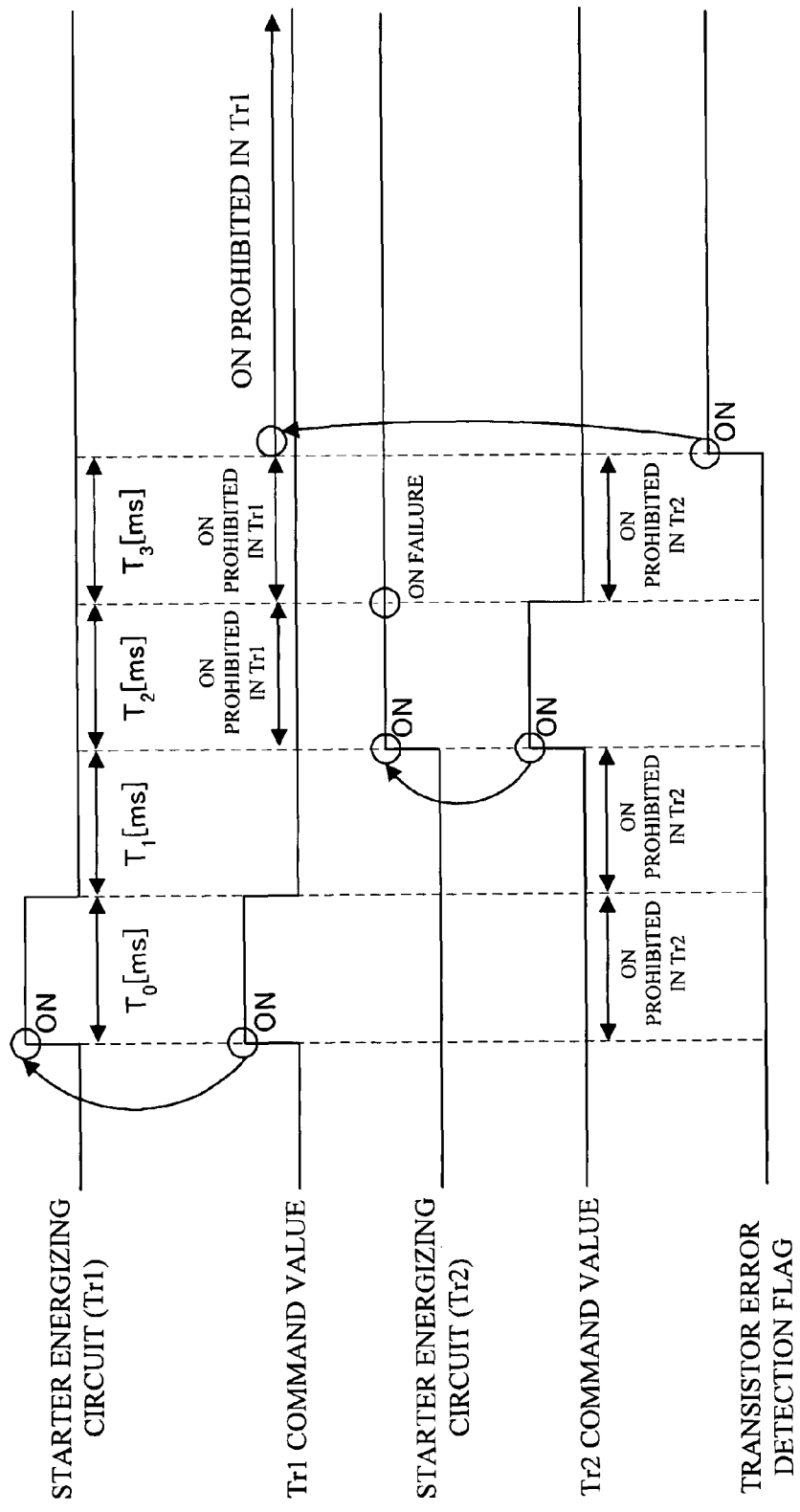
FIG. 5 is a timing chart of the signals observed in a case where the transistor Tr2 has ON failure.

Referring now to FIGS. 2 through 5, an operation to be performed by the control processing unit 20 to check the starter energizing circuit 30 for failure is described. FIG. 2 is a flowchart showing an example of the failure detecting operation. FIG. 3 is a timing chart of signals generated when the transistors Tr1 and Tr2 are both in a normal state. FIG. 4 is a timing chart of signals generated when there is failure in the transistor Tr1 in an ON state, and FIG. 5 is a timing chart of signals generated when there is failure in the transistor Tr2 in an ON state.

The starter energized circuit 30 is checked for failure before an idling stop operation is ended, where the shift change lever of the vehicle is in the D range, the vehicle speed is 20 km/h or higher, and the accelerator opening rate is 20% or higher. The timing of the failure check in the starter energizing circuit 30 is not particularly limited, but it is preferable that the failure check is performed while the vehicle is moving, since the driver hardly notices the noise caused when the transistors Tr1 and Tr2 are turned on and off.

When the failure check in the starter energizing circuit 30 is started, the control processing unit 20 first issues such a command value as to turn on the transistor Tr1 and to turn off the transistor Tr2, as shown in FIG. 2 (step ST1).

The control processing unit 20 then determines whether a predetermined period of time T0 (ms) has passed since the command to switch on the transistor Tr1 was issued (step ST2). If the control processing unit 20 determines that the predetermined period of time has passed, the control processing unit 20 determines whether there is OFF failure in the transistor Tr1 (whether the transistor Tr1 remains opened without becoming conductive in accordance with the ON command) (step ST3). Here, the predetermined period of time T0 is the time required for determining whether there is OFF failure in the transistor Tr1.

If the control processing unit 20 determines that there is OFF failure in the transistor Tr1, the control processing unit 20 turns on an error detection flag (step ST19), and ends the failure detecting operation. Accordingly, the control processing unit 20 determines that the idling stop control cannot be performed as long as the error detection flag is on.

If the transistor Tr1 does not have OFF failure, the transistor Tr1 enters an ON state when the command value issued to the transistor Tr1 is changed as shown in FIGS. 3 through 5. If the control processing unit 20 determines that the transistor Tr1 does not have OFF failure, the control processing unit 20 issues such a command value as to turn off both the transistors Tr1 and Tr2 (step ST4).

After issuing the command value to turn off both the transistors Tr1 and Tr2, the control processing unit 20 determines whether a predetermined period of time T1 (ms) has passed (step ST5), and puts the transistor Tr2 into an ON prohibited state (step ST6). Here, the predetermined period of time T1 is the time required for determining whether the transistor Tr1 has ON failure. The transistor Tr2 is put into the ON prohibited state, so that the transistors Tr1 and Tr2 are both put into an ON state when there is ON failure in the transistor Tr1.

After the predetermined period of time T1 passes, the control processing unit 20 determines whether there is ON failure in the transistor Tr1 (step ST7).

If the transistor Tr1 is in a normal state, the transistor Tr1 is put into an off state, as shown in FIGS. 3 and 5. If the transistor Tr1 has ON failure (remains conductive and closed), the transistor Tr1 remains in an ON state, as shown in FIG. 4.

If the control processing unit 20 determines that the transistor Tr1 has ON failure, the control processing unit 20 maintains the transistor Tr2 in the ON prohibited state (step ST8), and switches the error detection flag on (step ST19). The control processing unit 20 then ends (stops) the failure detecting operation.

If the control processing unit 20 determines that there is no ON failure in the transistor Tr1, the control processing unit 20 cancels the ON prohibition of the transistor Tr2 (step ST9). The control processing unit 20 then issues such a command value as to turn off the transistor Tr1 and turn on the transistor Tr2 (step ST10).

After issuing the command value to turn off the transistor Tr1 and turn on the transistor Tr2, the control processing unit 20 determines whether a predetermined period of time T2 (ms) has passed (step ST11). Here, the predetermined period of time T2 is the time required for determining whether there is OFF failure in the transistor Tr2.

After the predetermined period of time T2 (ms) passes, the control processing unit 20 determines whether there is OFF failure in the transistor Tr2 (step ST12). If the control processing unit 20 determines that there is OFF failure, the control processing unit 20 switches the error detection flag on (step ST19), and ends (stops) the failure detecting operation.

If the transistor Tr2 is in a normal state, the transistor Tr2 enters an ON state when the command value issued to the transistor Tr2 changes as shown in FIGS. 3 and 5. If the control processing unit 20 determines that there is no OFF failure in the transistor Tr2, the control processing unit 20 issues such a command value as to turn off both the transistors Tr1 and Tr2 (step ST13).

After issuing the command to turn off both the transistors Tr1 and Tr2, the control processing unit 20 determines whether a predetermined period of time T3 (ms) has passed (step ST14), and puts the transistor Tr1 into an ON prohibited state (step ST15). Here, the predetermined period of time is the time required for determining whether there is ON failure in the transistor Tr2. The transistor Tr1 is put into an ON prohibited state, so that both the transistors Tr1 and Tr2 cannot be put into an ON state when the transistor Tr2 has ON failure.

After the predetermined period of time T3 has passed, the control processing unit 20 determines whether there is ON failure in the transistor Tr2 (step ST16).

If the transistor Tr2 is in a normal state, the transistor Tr2 enters an OFF state, as shown in FIG. 3. If the transistor Tr2 has ON failure, the transistor Tr2 remains in an ON state, as shown in FIG. 5.

If the control processing unit 20 determines that the transistor Tr2 does not have ON failure, the control processing unit 20 cancels the ON prohibition of the transistor Tr2 (step ST18), and ends the failure detecting operation. Accordingly, the transistors Tr1 and Tr2 are both out of an ON prohibited state, and idling stop control can be performed on both transistors Tr1 and Tr2.

If the control processing unit 20 determines that there is ON failure in the transistor Tr2, the control processing unit 20 maintains the transistor Tr1 in an ON prohibited state (step ST17), and switches on the error detecting flag (step ST19). The control processing unit 20 then ends (stops) the failure detecting operation.

As described above, in accordance with this embodiment, the predetermined periods of time T0 through T3 are allotted to the OFF failure detection and the ON failure detection in the transistor Tr1 and the OFF failure detection and the ON failure detection in the transistor Tr2, respectively. Those detecting procedures are carried out sequentially, so that failure, particularly ON failure, can be detected with accuracy. During the checking process, failure is restrained when the starter relay 50 is inadvertently energized due to ON failure that turns on both transistors Tr1 and Tr2.

Second Embodiment

Figure 6:
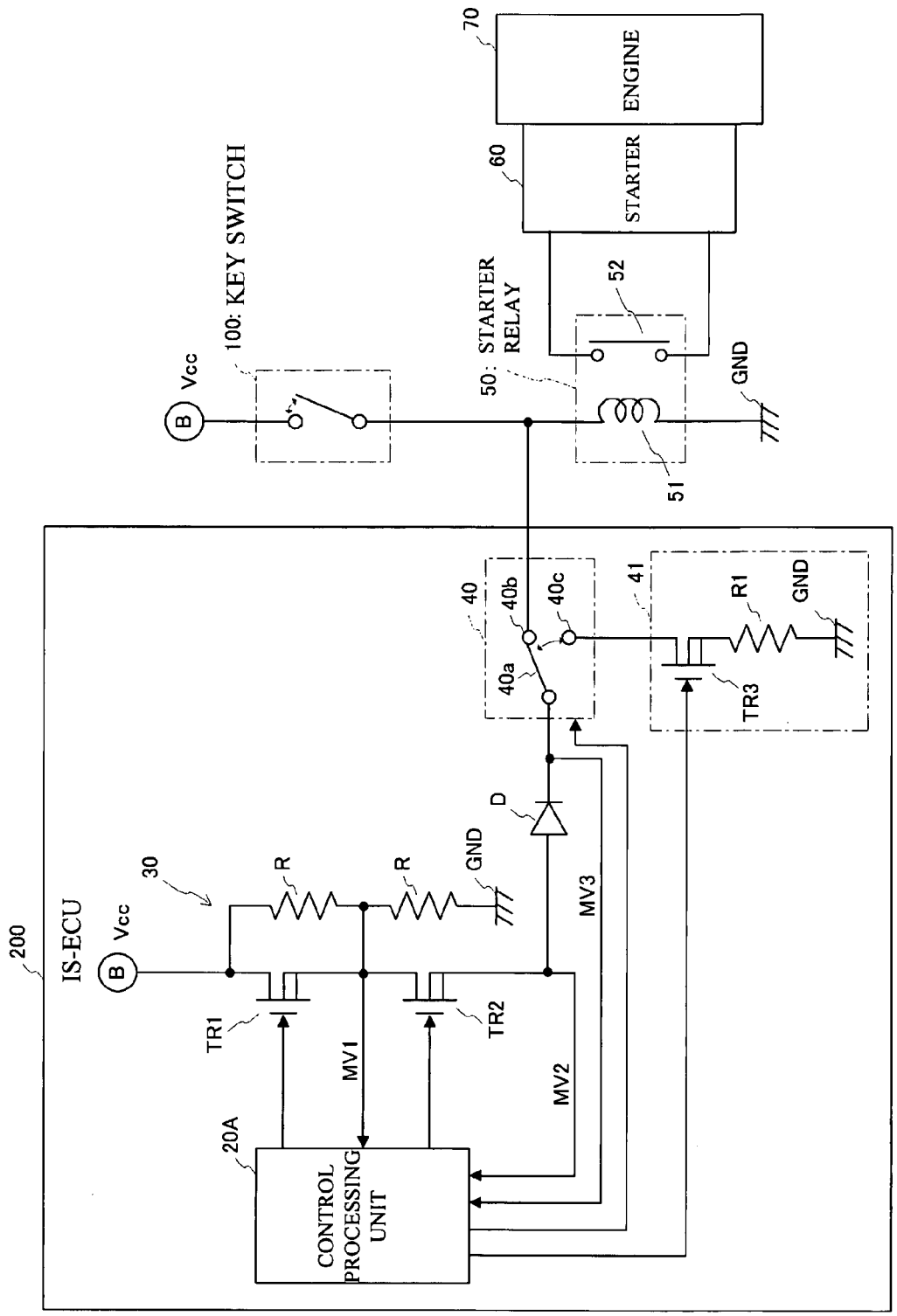
FIG. 6 shows the structure of an idling stop ECU in accordance with another embodiment of an engine start control device of the present invention to be applied to the starter of an engine, and also shows the peripheral components of the idling stop ECU.

FIG. 6 shows the structure of an idling stop ECU in accordance with another embodiment of an engine start control device of the present invention to be applied to the starter of an engine, and the peripheral components of the idling stop ECU. In FIG. 6, the same components as those shown in FIG. 1 are denoted by the same reference numerals as those in FIG. 1.

The IS-ECU 200 differs from the IS-ECU 10 in that the IS-ECU 200 includes a switching circuit 40 and a failure detecting circuit 41. Also, the later described operation to be performed by the control processing unit 20A of the IS-ECU 200 is different from the operation to be performed by the control processing unit 20.

As shown in FIG. 6, the failure detecting circuit 41 is a circuit that can be connected to the starter energizing circuit 30, instead of the starter relay 50. The failure detecting circuit 41 includes a resistor R1 having one end connected to the ground GND, and a transistor Tr3 as a switching element provided between the resistor R1 and the switching circuit 40.

The transistor Tr3 is turned on and off in accordance with a command from the control processing unit 20A, so as to open and close the electric connection path that connects the switching circuit 40 to the ground GND via the resistor R1.

As shown in FIG. 6, the switching circuit 40 includes a needle 40a that is electrically connected to the output end of the starter energizing circuit 30, a contact point 40b that is electrically connected to the starter relay 50, and a contact point 40c that is electrically connected to the failure detecting circuit 41. Upon receipt of a command from the control processing unit 20A, the needle 40a is designed to be selectively connected to one of the contact points 40b and 40c. In other words, the switching circuit 40 selectively switches the connection destination of the starter energizing circuit 30 between the starter relay 50 and the failure detecting circuit 41. The switching circuit 40 is normally connected to the starter energizing circuit 30 and the starter relay 50.

The control processing unit 20A is formed with hardware such as a processor and a memory, and necessary software. The control processing unit 20A performs a control operation necessary for idling stop control. More specifically, the control processing unit 20A performs an energization control operation by outputting such a control command as to turn on the transistors Tr1 and Tr2 to energize the starter relay 50 when automatic start requirements are satisfied in an idling stop control operation.

Together with monitor voltage values MV1 and MV2, a monitor voltage value MV3 for monitoring the voltage at the output end of the starter energizing circuit 30 is input to the control processing unit 20A. As will be described later, based on the monitor voltage values MV1 and MV2, the control processing unit 20A performs an operation for detecting failure in the transistors Tr1 and Tr2. Based on the monitor voltage value MV3, the control processing unit 20A determines whether the starter relay 50 is energized when the starter energizing circuit 30 does not allow the energization, while a failure detecting operation is not being performed. If the energization is not allowed, the control processing unit 20A disconnects the starter energizing circuit 30 from the starter relay 50.

Figure 7:
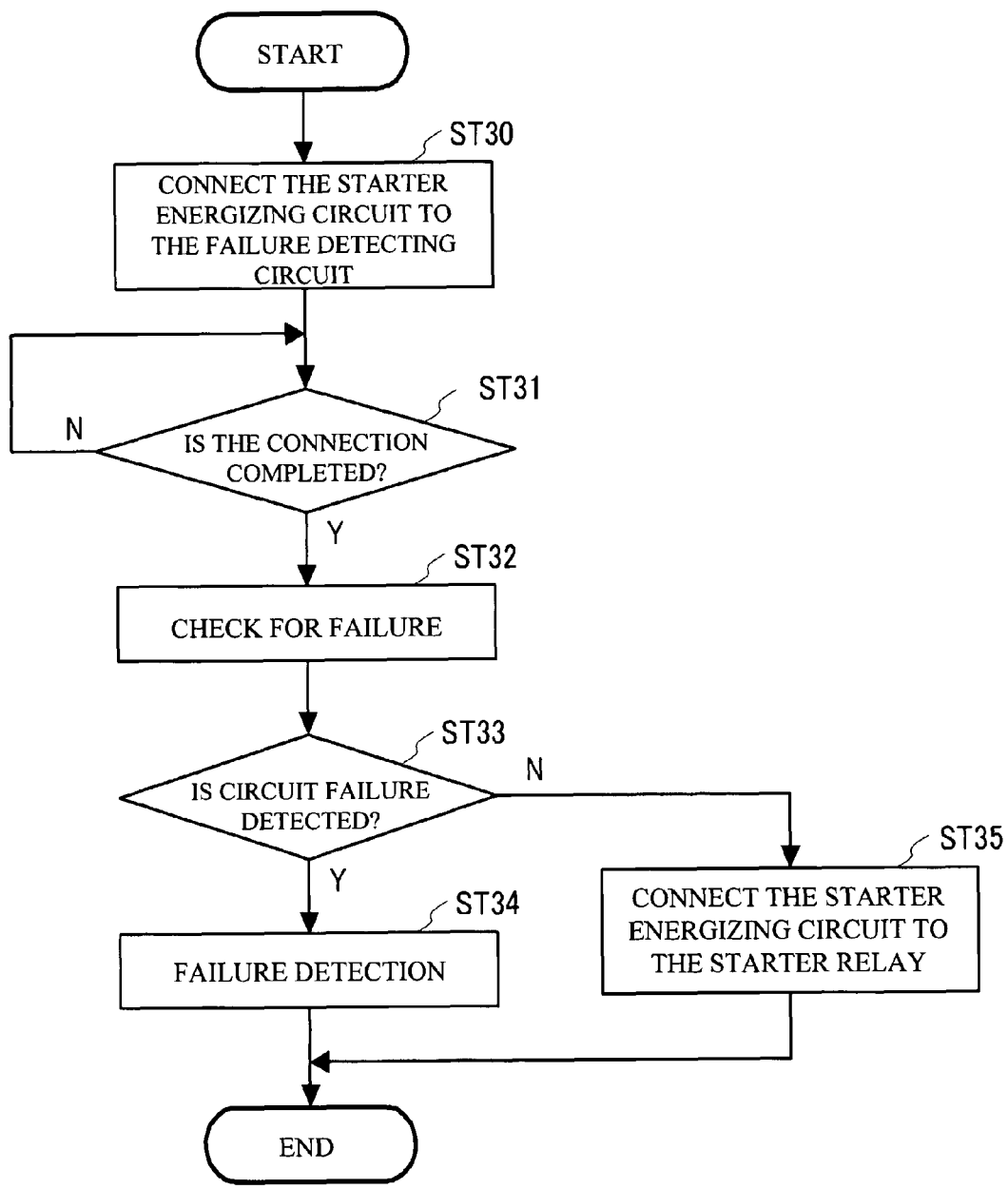
FIG. 7 is a flowchart showing a failure detecting operation to be performed by the control processing unit.

Referring now to the flowchart of FIG. 7, a failure detecting operation to be performed by the control processing unit 20A is described.

As in the foregoing embodiment, the control processing unit 20A starts a failure detecting operation under predetermined conditions. First, the control processing unit 20A controls the switching circuit 40 to disconnect the starter energizing circuit 30 from the starter relay 50 and connect the starter energizing circuit 30 to the failure detecting circuit 41 (step ST30). At this point, the control processing unit 20A issues an ON command to the transistor Tr3, so as to electrically connect the switching circuit 40 to the ground GND.

The control processing unit 20A determines whether the connection between the starter energizing circuit 30 and the failure detecting circuit 41 is completed (step ST31). When completion of the connection is confirmed, the control processing unit 20A performs an operation to check the transistors Tr1 and Tr2 for failure (step ST32). Here, the detecting method may be the same as the method utilized in the foregoing embodiment, or some other method may be utilized.

The control processing unit 20A then determines whether there is failure in the transistors Tr1 and Tr2 through the failure detecting operation (step ST33). If failure is not detected, the control processing unit 20A controls the switching circuit 40 to reconnect the starter energizing unit 30 to the starter relay 50 (step ST35), and ends the operation. This enables idling stop control.

If failure is detected, the control processing unit 20A performs predetermined failure detection (step ST34), and ends the failure detecting operation. In this situation, the starter energizing circuit 30 is not connected to the starter relay 50, and idling stop control is disabled.

In the predetermined failure detection in step ST34, the transistor Tr3 is opened so as to cut off the electric connection path between the switching circuit 40 and the ground GND and to prevent unnecessary power consumption, if both transistors Tr1 and Tr2 have ON failure.

As described above, in this embodiment, the switching circuit 40 and the failure detecting circuit 41 are employed, and the starter energizing circuit 30 is disconnected from the starter relay 50 during failure detection. Accordingly, the starter 60 is never inadvertently driven by turning both transistors Tr1 and Tr2 during the detection.

Figure 8:
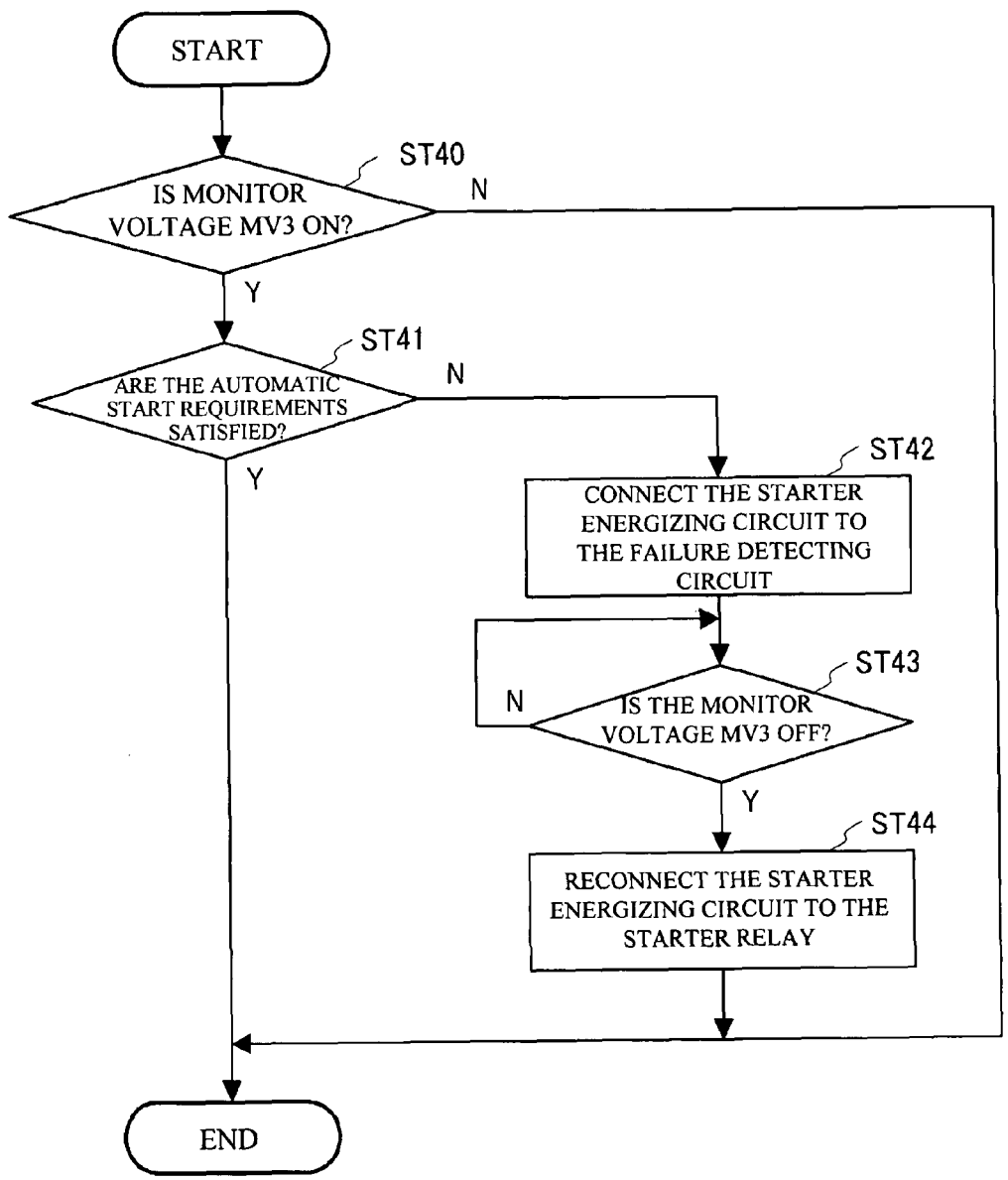
FIG. 8 is a flowchart showing an operation to disconnect the starter energizing circuit from the starter relay while failure detection is not being performed.

Referring now to the flowchart of FIG. 8, the operation of disconnecting the starter energizing circuit 30 from the starter relay 50 while failure detection is not being performed is described.

The control processing unit 20A monitors the monitor voltage value MV3, and determines whether the monitor voltage value MV3 indicates an ON command, or whether the starter energizing circuit 30 is energized (step ST40).

If the control processing unit 20A determines that the starter energizing circuit 30 is not energized, the operation comes to an end.

If the control processing unit 20A determines that the starter energizing circuit 30 is energized, the control processing unit 20A determines whether the automatic start requirements for performing idling stop control are satisfied as the predetermined requirements for disconnecting the starter energizing circuit 30 from the starter relay 50 (step ST41).

If the automatic start requirements are satisfied, there is nothing wrong in the starter energizing circuit 30 being energized, and therefore, the operation comes to an end.

If the automatic start requirements are not satisfied, the starter energizing circuit 30 is wrongly energized, and there is a high probability that the starter 60 is driven against the intention. Therefore, the control processing unit 20A disconnects the starter energizing circuit 30 from the starter relay 50, and connects the starter energizing circuit 30 to the failure detecting circuit 41. By doing so, the energization of the starter relay 50 is cut off, and the driving of the starter 60 is stopped.

After connecting the starter energizing circuit 30 to the failure detecting circuit 41, the control processing unit 20A determines whether the monitor voltage value MV3 indicates an OFF command, or whether the starter energizing circuit 30 is stopped being energized and is returned to a normal state (step ST43).

After returning to a normal state, the control processing unit 20A reconnects the starter energizing circuit 30 to the starter relay 50, and ends the operation.

As described above, in this embodiment, the failure detecting circuit 41 is utilized so that the starter energizing circuit 30 can be disconnected from the starter relay 50, when an error is caused in the starter energizing circuit 30 while failure detection is not being performed.

Third Embodiment

Figure 9:
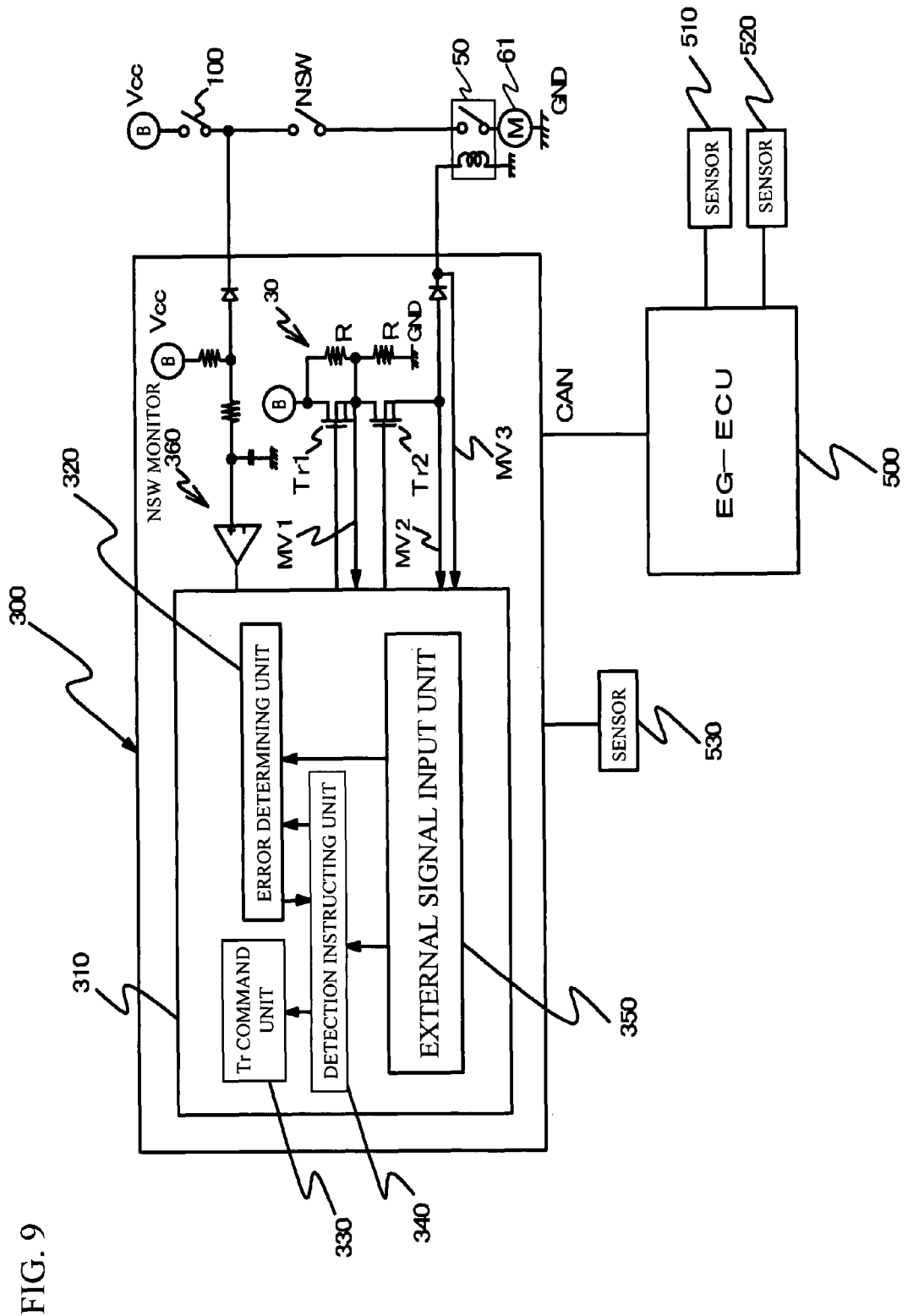
FIG. 9 shows the structure of an idling stop ECU in accordance with yet another embodiment of an engine start control device of the present invention.

FIG. 9 shows the structure of an idling stop ECU in accordance with yet another embodiment of an engine start control device of the present invention to be applied to the starter of an engine, and the peripheral components of the idling stop ECU. In FIG. 9, the same components as those shown in FIG. 1 or 6 are denoted by the same reference numerals as those in FIG. 1 or 6. In FIG. 9, a starter motor 61 provided in the starter 60 is connected between the starter relay 50 and the ground GND.

As shown in FIG. 9, this IS-ECU 300 includes a control processing unit 310, a starter energizing circuit 30, and a NSW monitor 360.

An engine ECU (hereinafter referred to as the EG-ECU) 500 is connected to the IS-ECU 300 with a CAN (Controller Area Network), and a vehicle speed sensor 530 is also connected to the IS-ECU 300. The EG-ECU 500 controls the engine of the vehicle, and has a shift sensor 510 and a throttle valve opening sensor 520 connected thereto. With this structure, the IS-ECU 300 acquires various kinds of information (such as shift location information and throttle valve opening information) related to the vehicle through the CAN, and also acquires the vehicle speed from the vehicle speed sensor 530.

The NSW monitor 360 detects the state of a neutral switch NSW provided between the key switch 100 and the starter relay 50, and outputs the detected state to the control processing unit 310. The neutral switch NSW is a switch that is turned on (connected) when the change gear of the vehicle is in a neutral state in which power transmission is not performed between the input axis and the output axis.

The control processing unit 310 includes an error determining unit 320, a Tr command unit 330, a detection instructing unit 340, and an external signal input unit 350. Those components are realized by hardware such as a processor and a memory (not shown), and necessary software.

The detection instructing unit 340 determines which detection should be carried out in accordance with external input data and the results of detection of errors in the transistors Tr1 and Tr2. The detection instructing unit 340 also determines whether to carry out failure detection in the transistors Tr1 and Tr2 when there is a circuit error in the starter energizing circuit 30 or based on external input data.

In accordance with a later described detection pattern of the detection instructing unit 340, the Tr command unit 330 issues a command to turn on/off the transistors Tr1 and Tr2.

Based on the monitor voltage values MV1 and MV2 and the contents of the command issued to the transistors Tr1 and Tr2, the error determining unit 320 determines whether the transistors Tr1 and Tr2 are in an abnormal state.

The external signal input unit 350 obtains the vehicle speed, CAN communication data, the monitor voltage values MV1 through MV3, and the likes.

FIG. 10 shows the relationship between detection patterns and the monitor voltage values MV1 and MV2 in a case where the starter energizing circuit 30 is in a normal state.

As shown in FIG. 1, in a detection pattern 1, the transistors Tr1 and Tr2 are both turned off, and the monitor voltage value MV1 is Vcc/2 while the monitor voltage value MV2 is off. In a detection pattern 2, the transistor Tr1 is turned off, and the transistor Tr2 is turned on. In this case, the monitor voltage value MV1 is at the ground level (GND), and the monitor voltage value MV2 is off. In a detection pattern 3, the transistor Tr1 is turned on, and the transistor Tr2 is turned off. In this case, the monitor voltage value MV1 is Vcc, and the monitor voltage value MV2 is off. In a detection pattern 4, the transistors Tr1 and Tr2 are both turned on. In this case, the monitor voltage value MV1 is Vcc, and the monitor voltage value MV2 is on.

If the transistors Tr1 and Tr2 break down, the monitor voltage values MV1 and MV2 exhibit different values from those shown in FIG. 10. Accordingly, based on the monitor voltage values MV1 and MV2 and the command values (indicating "on" or "off") given to the transistors Tr1 and Tr2, it is possible to determine whether the transistors Tr1 and Tr2 are in an abnormal state.

Referring now to the flowcharts shown in FIGS. 11 through 14, operations to be performed by the control processing unit 310 to check the transistors Tr1 and Tr2 are described. The operations shown in FIGS. 11 through 14 are to be performed at predetermined intervals.

Figure 11:
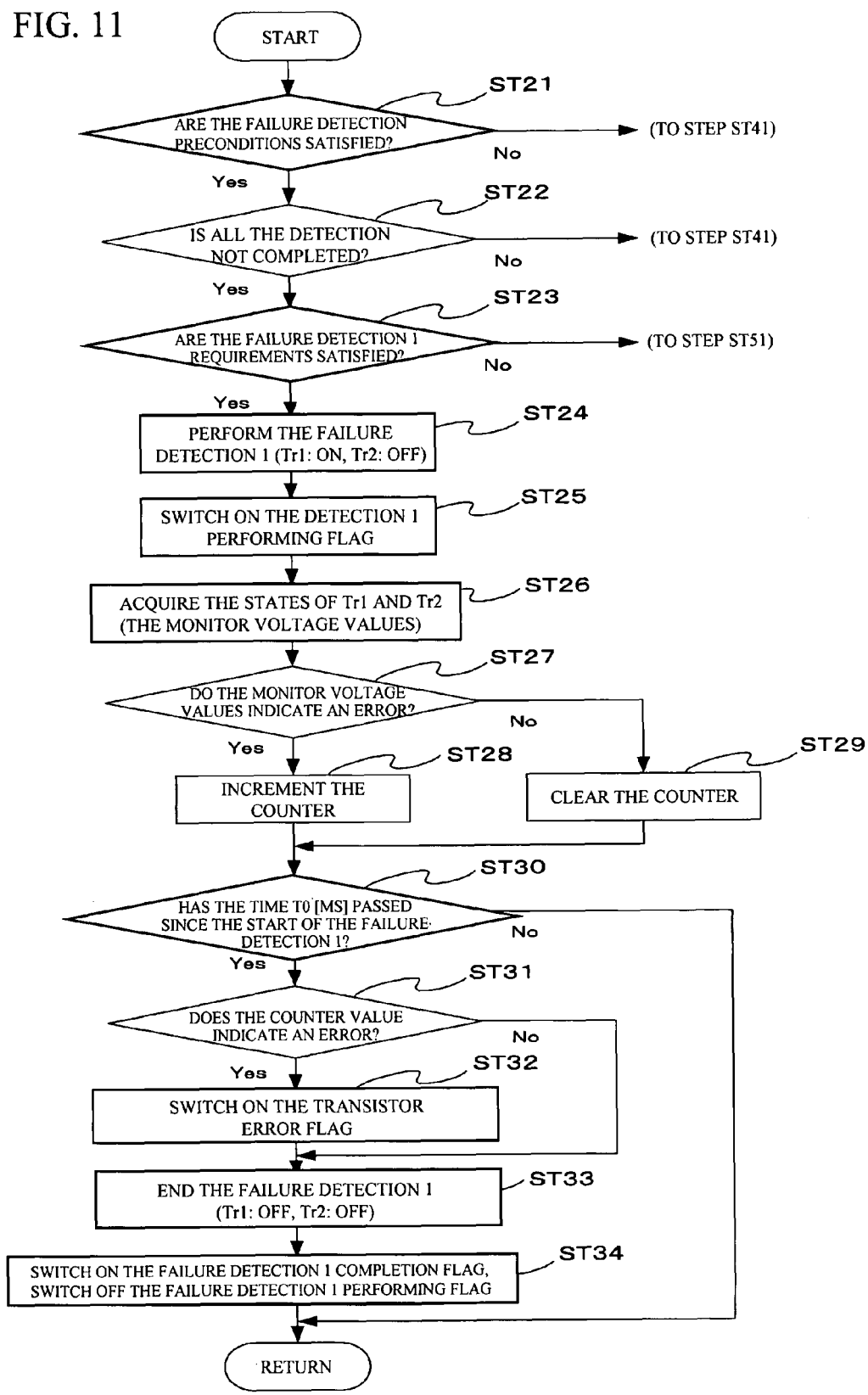
FIG. 11 is a flowchart showing a failure detecting operation to be performed by the control processing unit shown in FIG. 9.

As shown in FIG. 11, the control processing unit 310 first determines whether failure detection preconditions are satisfied (step ST21). The preconditions for starting failure detection are that the shift position is within the D range, there is not an error in the starter energizing circuit 30 (the transistors Tr1 and Tr2 do not have ON failure), there is not an error in the vehicle speed sensor 530, the vehicle speed is 20 km or higher, the throttle valve opening is 20%, the CAN (communication) is in a normal state, the starter 60 (the starter motor 61) is not driven, and the likes. The starter motor 61 should not be driven, because the monitor voltage values MV1 through MV3 are changed in a detecting operation performed while the motor is being driven, and accurate values cannot be detected.

In step ST21, based on the monitor voltage values MV1 and MV2 and the contents of the commands issued to the transistors Tr1 and Tr2, the control processing unit 310 determines whether there is an error in the transistors Tr1 and Tr2 (whether there is ON failure). If there is not an error, OFF failure detection is carried out in the transistor Tr1, and OFF failure detection is carried out in the transistor Tr2, as will be described later. If there is an error, a transistor error flag is switched on.

Figure 12:
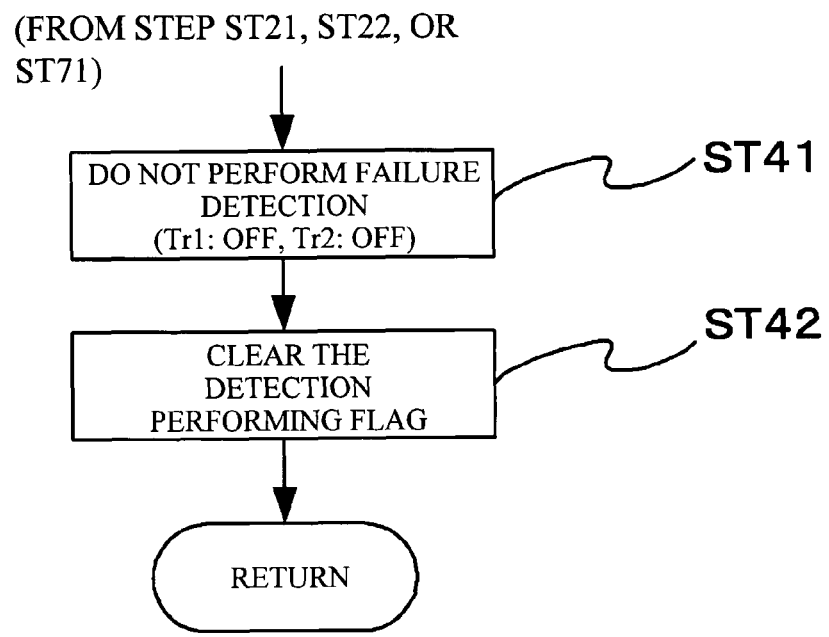
FIG. 12 is a flowchart showing an operation continuing from FIG. 11.

If the failure detection preconditions are not satisfied, the control processing unit 310 performs a failure non-detecting operation to issue OF commands to the transistors Tr1 and Tr2, as shown in FIG. 12 (step ST41). The control processing unit 310 then clears the detection performing flag (step ST42). If the failure detection preconditions are satisfied in step ST21, the control processing unit 310 determines whether the later described failure detection 1 (a check for OFF failure in the transistor Tr1), ON failure detection (a check for ON failure in the transistor Tr1), and failure detection 2 (a check for OFF failure in the transistor Tr2) have been completed, as shown in FIG. 11 (step S22). This determination is carried out based on the states of a detection 1 completion flag, an ON failure detection completion flag, and an detection 2 completion flag that will be described later. If the failure detection 1, the failure detection 1, and the ON failure detection are all completed, the control processing unit 310 carries out the above procedures of steps ST41 and ST42.

If there is unperformed detection among the failure detection 1, the failure detection 2, and the ON failure detection, the control processing unit 310 determines whether the failure detection 1 requirement (the requirement for starting the failure detection 1) is satisfied.

Here, the requirement for starting the failure detection 1 is that the detection 1 completion flag is off, or the failure detection 1 has not been performed.

Figure 13:
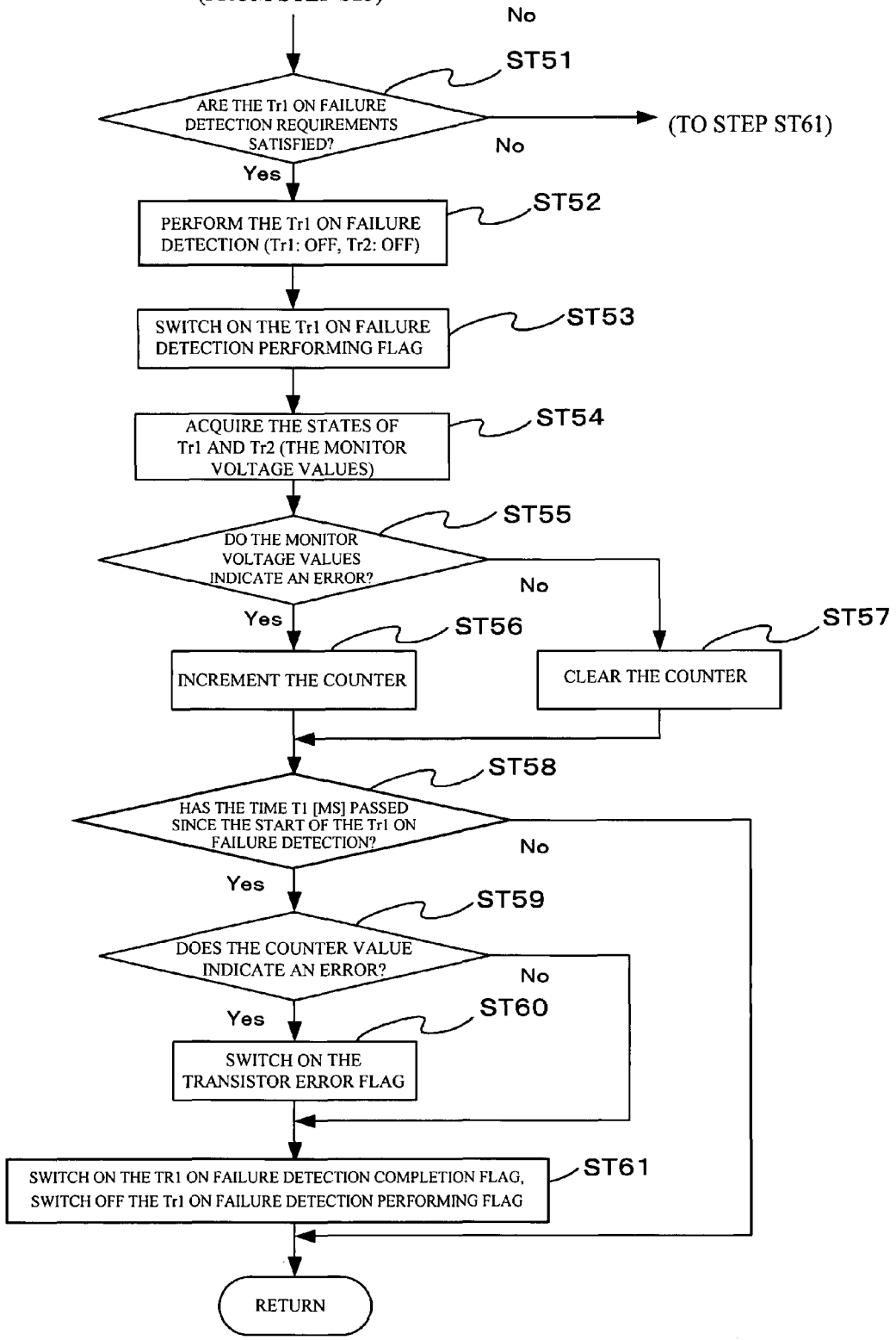
FIG. 13 is a flowchart showing an operation continuing from FIG. 11.

If the requirement for starting the failure detection 1 is not satisfied, the control processing unit 310 performs the later described operation (an operation related to the ON failure detection) shown in FIG. 13.

If the requirement for starting the failure detection 1 is satisfied, the control processing unit 310 issues an ON command to the transistor Tr1 and an OFF command to the transistor Tr2. The control processing unit 310 then performs the failure detection 1 (step ST24), and switches on a detection 1 performing flag indicating the failure detection 1 is being performed (step ST25).

The control processing unit 310 then acquires the states of the transistors Tr1 and Tr2, which are the monitor voltage values MV1 and MV2 (step ST26), and then determines whether the monitor voltage values MV1 and MV2 indicate an error (step ST27), as mentioned with reference to FIG. 10.

If there is an error, the control processing unit 310 increments a predetermined counter (step ST28). If there is not an error, the control processing unit 310 clears the counter (step ST29).

The control processing unit 310 then determines whether the predetermined period of time T0 [ms] has passed since the start of the failure detection 1 (step ST30). If the predetermined period of time T0 has passed, the control processing unit 310 determines whether the value of the counter indicates an error (step ST31). If the value of the counter is determined to indicate an error, the transistor error flag indicating that a transistor is in an abnormal state is turned on (step ST32). After that, a failure detection 1 ending process to issue such a command as to turn off the transistors Tr1 and Tr2 is carried out (step ST33). The failure detection 1 completion flag is then turned on, and a failure detection performing flag is turned off (step ST34).

If the requirements for starting the failure detection 1 are not satisfied in step ST23, the control processing unit 310 determines whether the requirements for starting the ON failure detection (a check for ON failure in the transistor Tr1) are satisfied (step ST51).

If the requirements for starting the failure detection 1 are not satisfied, a later described operation shown in FIG. 14 (an operation related to the failure detection 2) is performed.

If the ON failure detection requirements are satisfied, OFF commands are issued to the transistors Tr1 and Tr2, and the ON failure detection is performed in the transistor Tr1 (step ST52). After that, a Tr1 ON failure detection flag indicating that the transistor Tr1 is being checked for ON failure is turned on (step ST52). The control processing unit 310 then acquires the states of the transistors Tr1 and Tr2 (the monitor voltage values MV1 and MV2) (step ST54), and determines whether the monitor voltage values MV1 and MV2 indicate an error (step ST55). If there is an error, the predetermined counter is incremented (step ST56). If there is not an error, the counter is cleared (step ST57). The control processing unit 310 further determines whether the predetermined period of time T1 [ms] has passed since the start of the Tr1 ON failure detection (step ST58). If the predetermined period of time T1 has passed, the control processing unit 310 determines whether the value of the counter indicates an error (step ST59). If there is an error, the transistor error flag is switched on (step ST60). After that, the Tr1 ON failure detection completion flag is switched on, and the Tr1 ON failure detection performing flag is switched off (step ST61).

Figure 14:
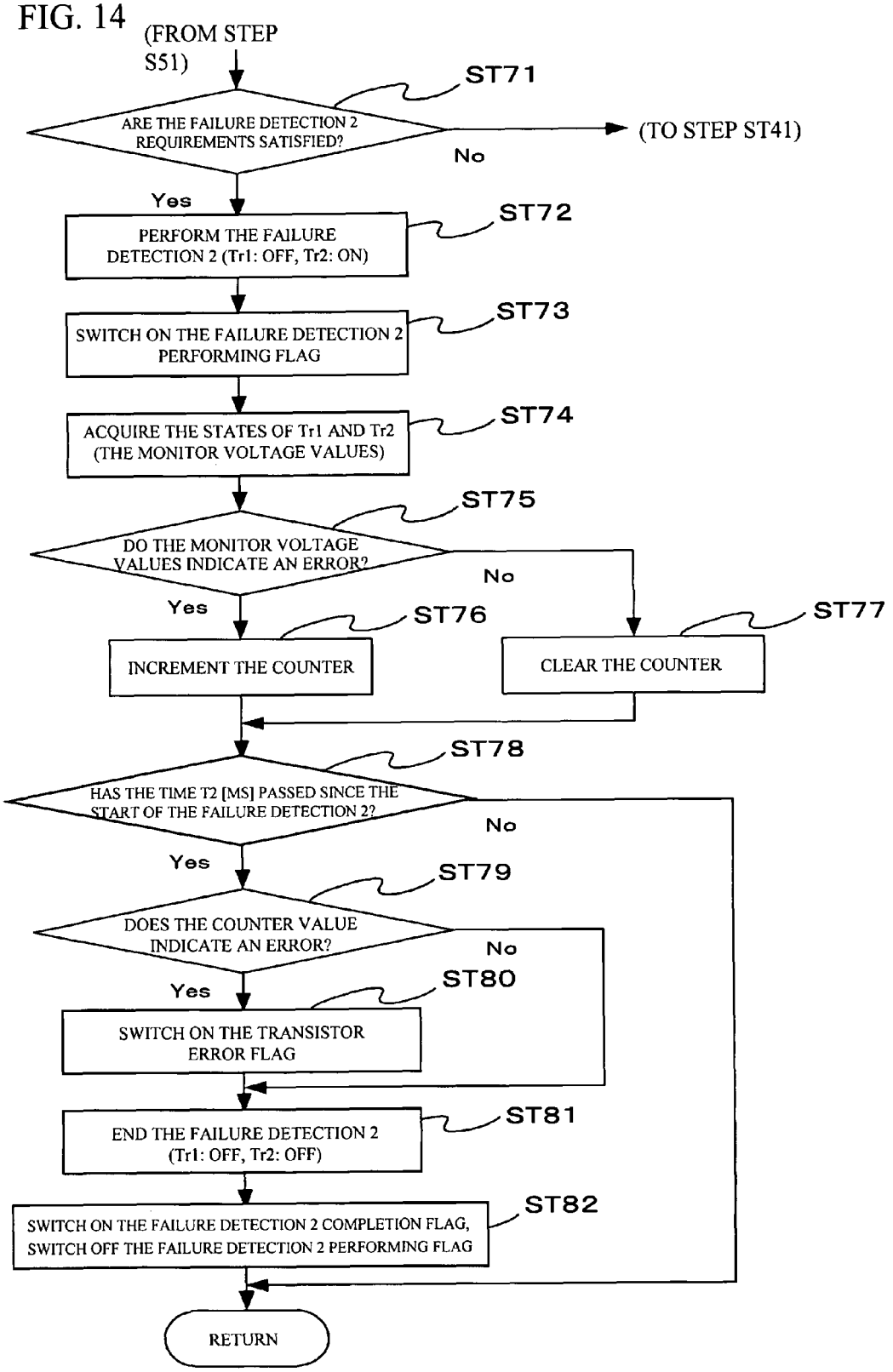
FIG. 14 is a flowchart showing an operation continuing from FIG. 13.

If the requirements for performing the ON failure detection are not satisfied in step ST51, the control processing unit 310 determines whether the failure detection 2 requirements for starting the failure detection 2 are satisfied (step ST71), as shown in FIG. 14. If the failure detection 2 requirements are not satisfied, the procedures of steps ST41 and ST42 shown in FIG. 12 are carried out.

If the failure detection 2 requirements are satisfied, the control processing unit 310 issues an OFF command to the transistor Tr1 and an ON command to the transistor Tr2, and performs the failure detection 2 (step ST72). After that, a failure detection 2 performing flag indicating that the failure detection 2 is being performed is switched on (step ST73). The control processing unit 310 then acquires the states of the transistors Tr1 and Tr2 (the monitor voltage values MV1 and MV2) (step ST74), and determines whether the monitor voltage values MV1 and MV2 indicate an error (step ST75). If there is an error, a predetermined counter is incremented (step ST76). If there is not an error, the counter is cleared (step ST77). Further, the control processing unit 310 determines whether the predetermined period of time T2 [ms] has passed since the start of the failure detection 2 (step ST78). If the predetermined period of time T2 has passed, the control processing unit 310 determines whether the value of the counter indicates an error (step ST79). If the value of the counter indicates an error, the transistor error flag is switched on (step ST80). After that, the control processing unit 310 issues OFF commands to the transistors Tr1 and Tr2, and carries out a failure detection 2 ending process (step ST81). The failure detection 2 completion flag is then switched on, and the failure detection performing flag is switched off (step ST82).

Figure 15:
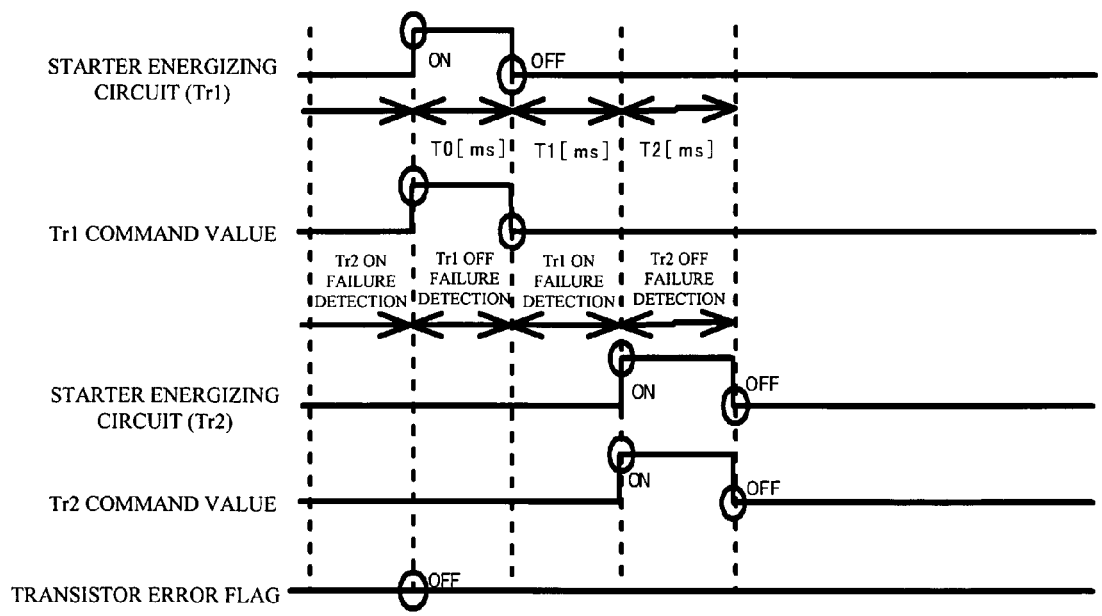
FIG. 15 is a timing chart of the signals observed in a case where the transistors Tr1 and Tr2 are both in a normal state.
Figure 16:
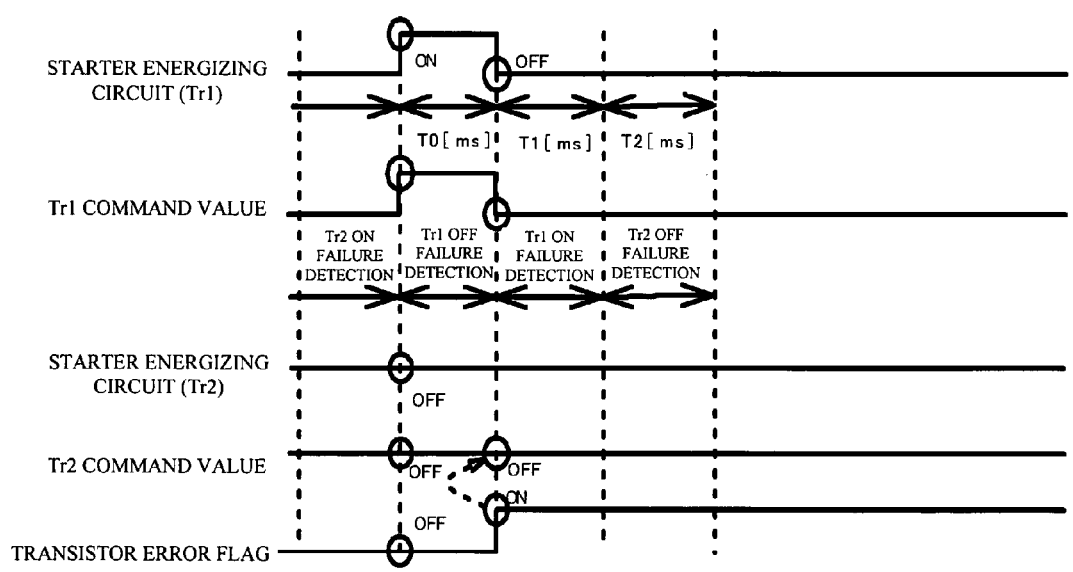
FIG. 16 is a timing chart of the signals observed in a case where the transistor Tr1 has failure.
Figure 17:
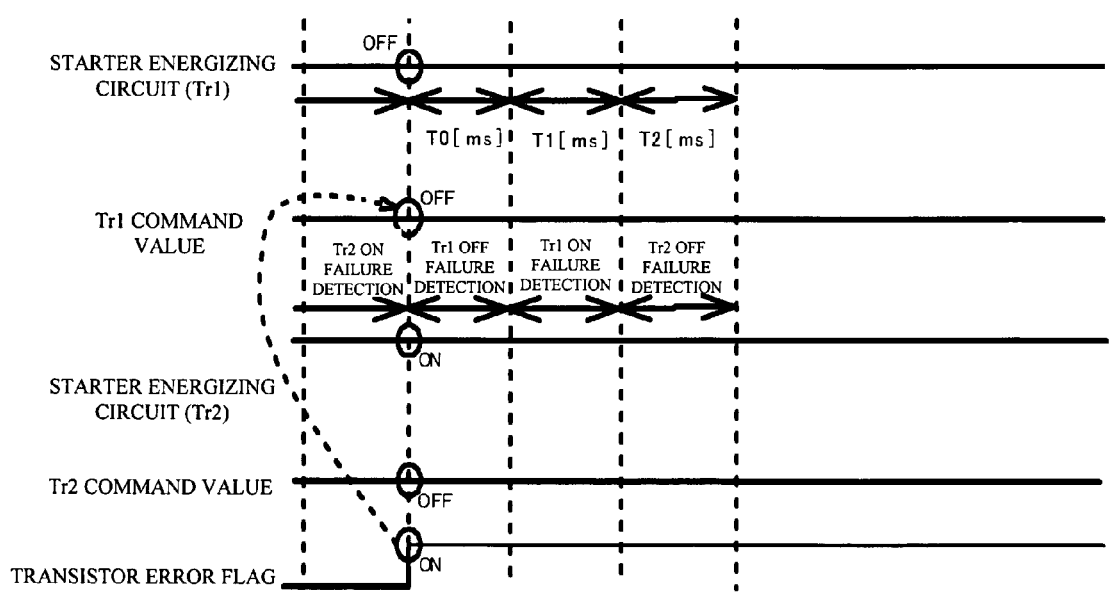
FIG. 17 is a timing chart of the signals observed in a case where the transistor Tr2 has failure.

Referring now to the timing charts shown in FIGS. 15 through 17, the relations among various signals in the above detecting operations are described.

FIG. 15 is a timing chart of a case where the transistors Tr1 and Tr2 are both in a normal state. FIG. 16 is a timing chart of a case where there is failure in the transistor Tr1. FIG. 17 is a timing chart of a case where there is failure in the transistor Tr2.

In the case where the transistors Tr1 and Tr2 are both in a normal state, the transistor error flag is off, as shown in FIG. 15. Therefore, the value of the command issued to the transistor Tr1 is changed from OFF to ON. As the value of the command to the transistor Tr1 is switched from OFF to ON, the transistor Tr1 is turned on. After the predetermined period of time T0 [ms] has passed, the value of the command is changed to OFF, and the transistor Tr1 is turned off. After the predetermined period of time T1 [ms] has passed, the value of the command to the transistor Tr2 is switched to ON, and the transistor Tr2 is turned on. After the predetermined period of time T2 [ms] has passed, the command value is switched to OFF, and the transistor Tr2 is turned off.

In the case where the transistor Tr1 has ON failure, the transistor Tr1 is not turned off when the value of the command to the transistor Tr1 is changed from ON to OFF, as shown in FIG. 16. Therefore, the transistor error flag is switched on. In other words, the transistor error flag is switched on before the OFF failure detection is performed in the transistor Tr2. Accordingly, the value of the command to the transistor Tr2 is not switched to ON, and the detection thereafter is aborted or stopped.

In the case where the transistor Tr2 has ON failure, the transistor error flag is switched on before the OFF failure detection is performed in the transistor Tr1, as shown in FIG. 17. Therefore, the value of the command to the transistor Tr1 is not switched to ON, and the detection thereafter is aborted or stopped.

Figure 18:
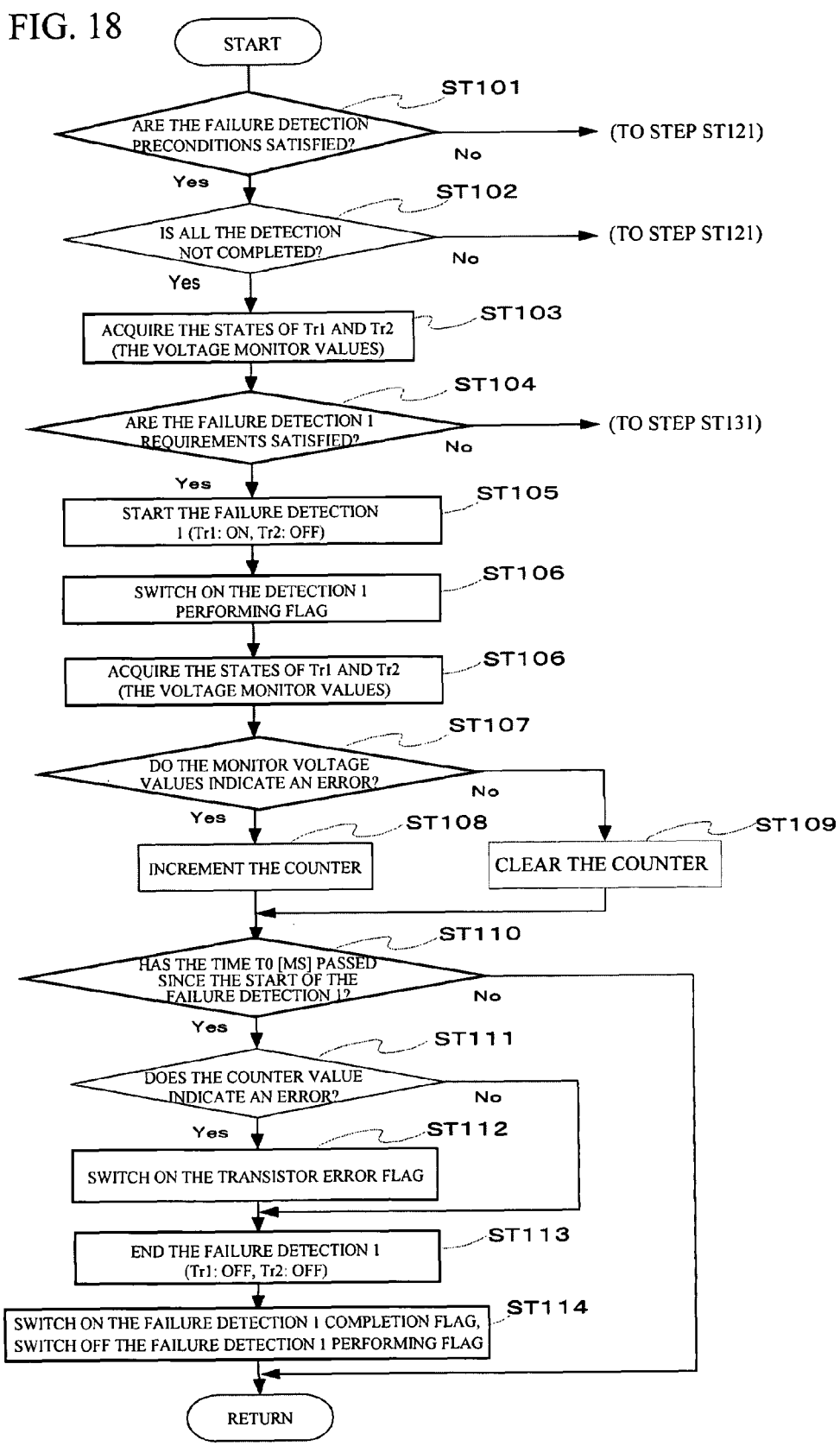
FIG. 18 is a flowchart showing another failure detecting operation to be performed by the control processing unit shown in FIG. 9.
Figure 19:
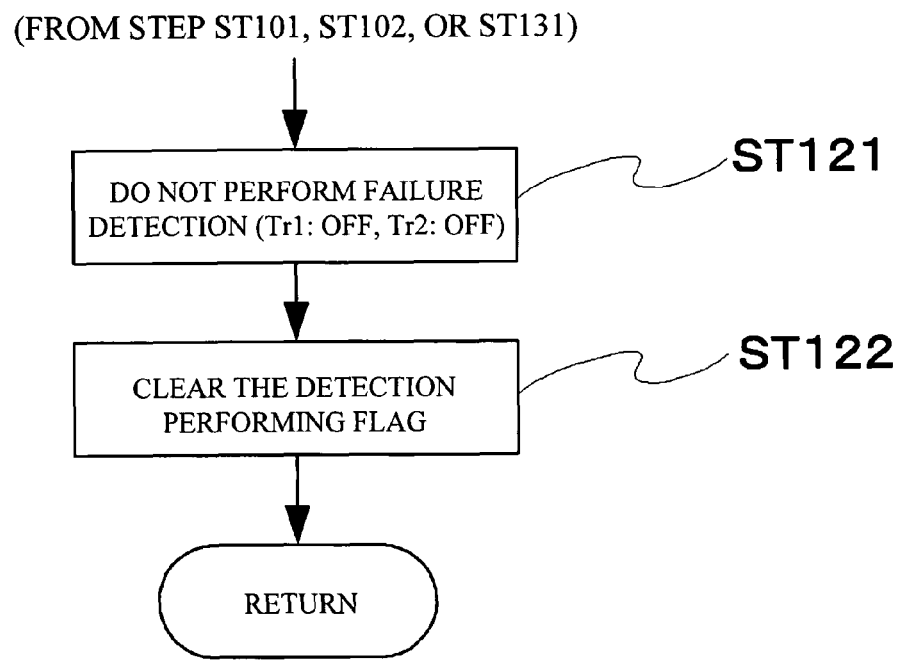
FIG. 19 is a flowchart showing an operation continuing from FIG. 18.
Figure 20:
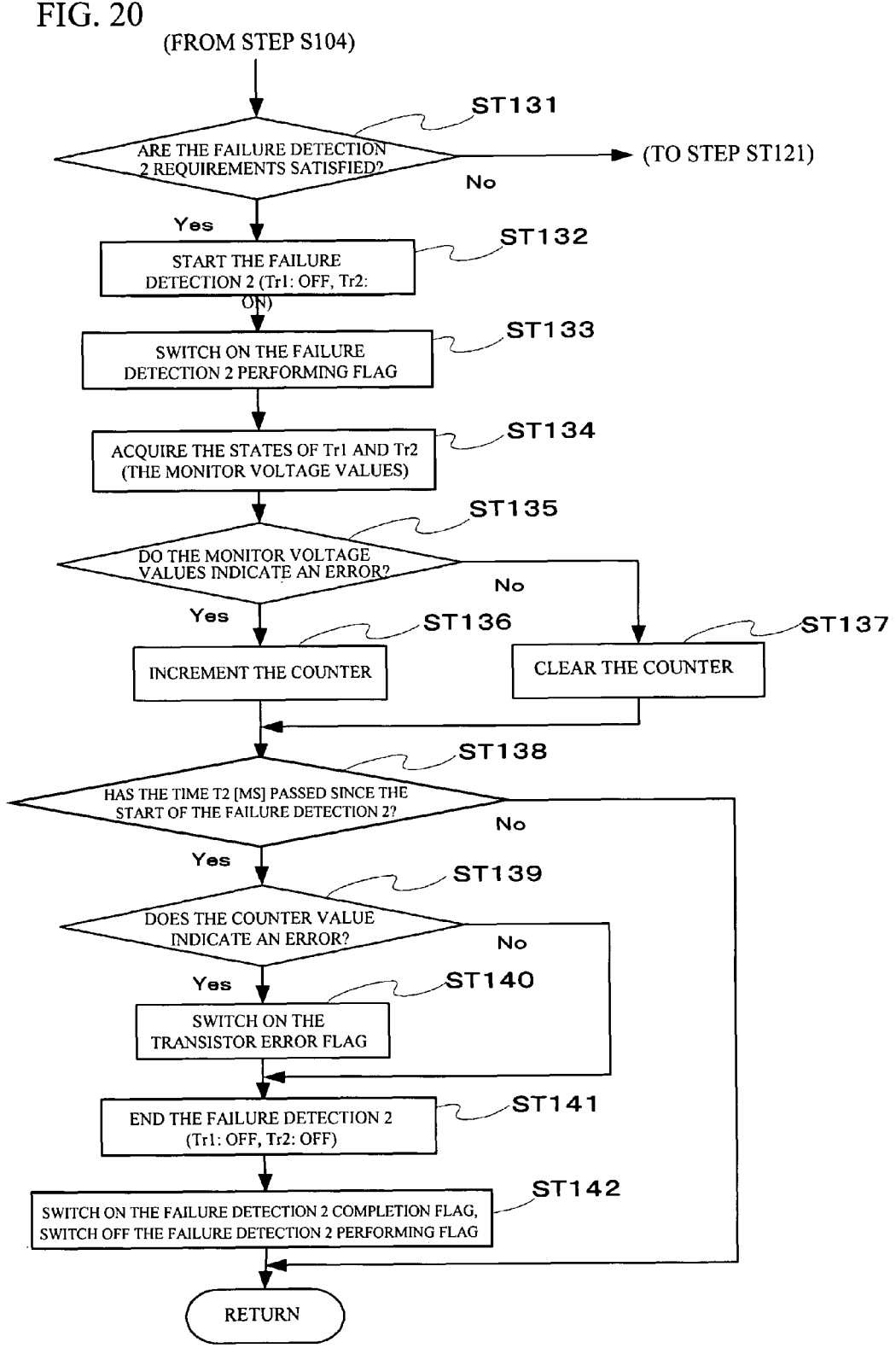
FIG. 20 is a flowchart showing an operation continuing from FIG. 18.

Referring now to the flowcharts shown in FIGS. 18 through 20, other examples of operations to be performed by the control processing unit 310 to check the transistors Tr1 and Tr2 are described. The operations shown in FIGS. 18 through 20 are performed at predetermined intervals.

In a detecting operation in accordance with this embodiment, the control processing unit 310 first determines whether the failure detection preconditions are satisfied (step ST101), as shown in FIG. 18. This procedure is the same as the above described procedure in step ST21.

If the failure detection preconditions are not satisfied, the control processing unit 310 carries out a failure non-detecting procedure to issue OFF commands to the transistors Tr1 and Tr2 (step ST121), and clears the detection performing flag (step ST122), as shown in FIG. 19.

If the failure detection preconditions are satisfied in step ST101, the control processing unit 310 determines whether the failure detection 1 (OFF failure detection in the transistor Tr1) and the failure detection 2 (OFF failure detection in the transistor Tr2) have been completed (step ST102), as shown in FIG. 18. This determination is carried out based on the states of the detection 1 completion flag and the detection 2 completion flag.

If the failure detection 1 and the failure detection 2 have been completed, the procedures of steps ST121 and ST122 shown in FIG. 19 are carried out.

If at least one of the failure detection 1 and the failure detection 2 has not been performed, the control processing unit 310 acquires the states of the transistors Tr1 and Tr2 from the monitor voltage values MV1 and MV2 (step ST103).

The control processing unit 310 then determines whether the failure detection 1 requirements (the requirements for starting the failure detection 1) are satisfied (step ST104).

Here, the failure detection 1 requirements are that the failure detection 1 has not been performed, and the transistors Tr1 and Tr2 are both determined to be in an OFF state based on the monitor voltage values MV1 and MV2 acquired in step ST103. In other words, before the failure detection 1 is performed, a check is made to confirm that the transistors Tr1 and Tr2 are off.

If the requirements for starting the failure detection 1 are not satisfied, the operation shown in FIG. 20 (an operation related to the failure detection 2) is performed.

If the requirements for starting the failure detection 1 are satisfied, the control processing unit 310 issues an ON command to the transistor Tr1 and an OFF command to the transistor Tr2, and performs the failure detection 1 (step ST105). The procedures of steps ST106 through ST114 to be carried out thereafter are the same as the procedures of steps ST24 through ST34 shown in FIG. 11.

If the requirements for starting the failure detection 1 are not satisfied in step ST104, the control processing unit 310 determines whether the failure detection 2 (the OFF failure detection in the transistor Tr2) has been completed (step ST131), as shown in FIG. 20. Here, the failure detection 2 requirements are that the failure detection 2 has not been performed, and the transistors Tr1 and Tr2 are both determined to be in an OFF state based on the monitor voltage values MV1 and MV2 acquired in step ST103.

If the failure detection 2 requirements are satisfied, the control processing unit 310 issues an ON command to the transistor Tr2 and an OFF command to the transistor Tr2, and performs the failure detection 2 (step ST132). The procedures of steps ST133 through ST142 to be carried out thereafter are the same as the procedures of steps ST73 through ST82 shown in FIG. 14.

Figure 21:
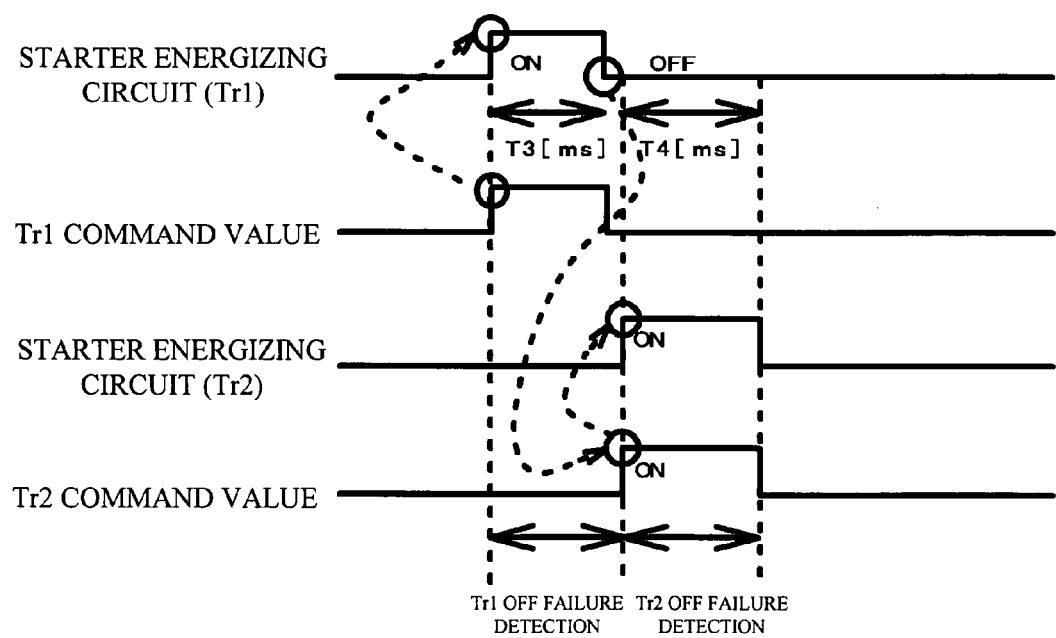
FIG. 21 is a timing chart of the signals observed in a case where the transistors Tr1 and Tr2 are both in a normal state.
Figure 22:
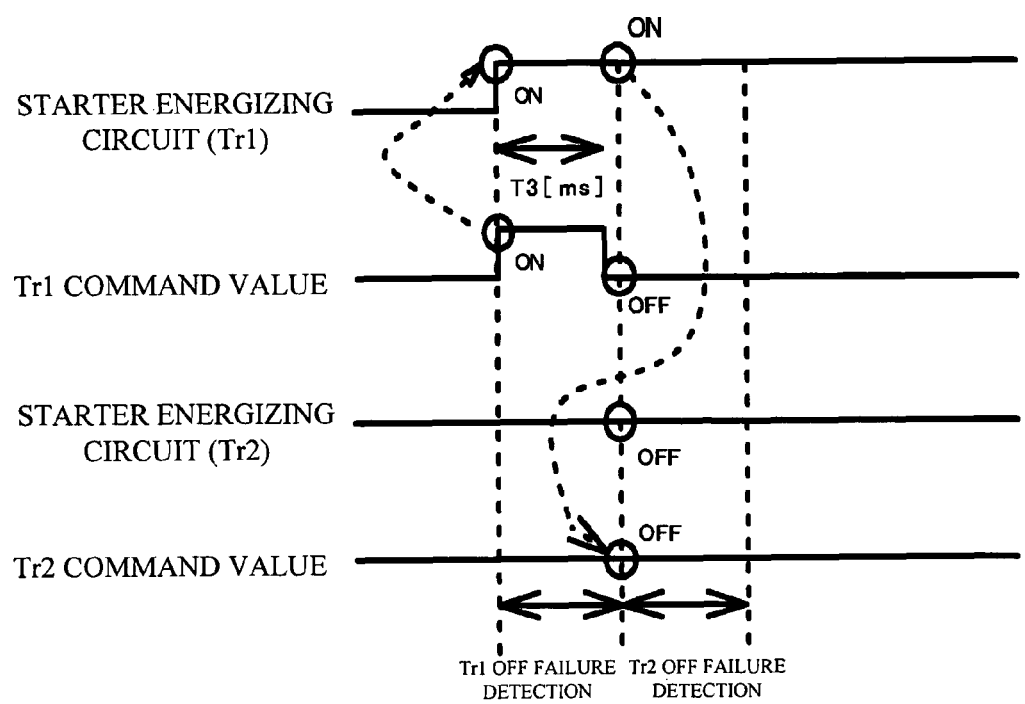
FIG. 22 is a timing chart of the signals observed in a case where the transistor Tr1 has failure.
Figure 23:
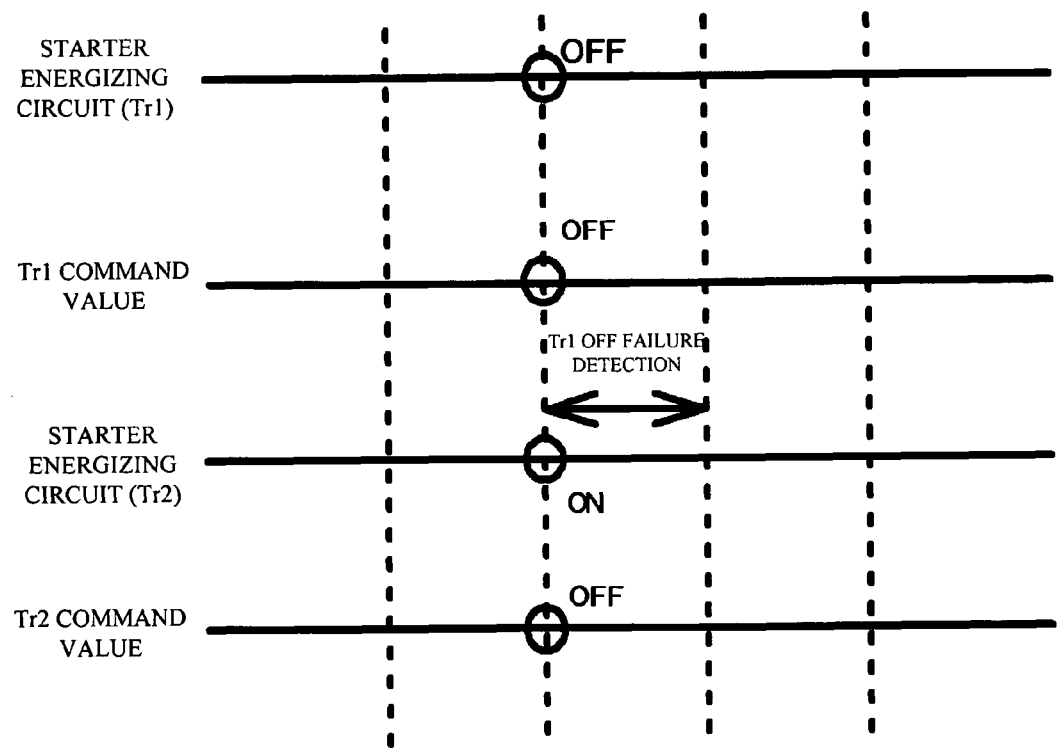
FIG. 23 is a timing chart of the signals observed in a case where the transistor Tr2 has failure.

Referring now to the timing charts shown in FIGS. 21 through 23, the relations among various signals in the above detecting operations are described.

FIG. 21 is a timing chart of a case where the transistors Tr1 and Tr2 are both in a normal state. FIG. 22 is a timing chart of a case where there is failure in the transistor Tr1. FIG. 23 is a timing chart of a case where there is failure in the transistor Tr2.

In the case where the transistors Tr1 and Tr2 are both in a normal state, the transistor Tr1 is turned on when the value of the command to the transistor Tr1 is changed from OFF to ON. When the command value is changed to OFF after a predetermined period of time T3 [ms] has passed, the transistor Tr1 is turned off. After it is confirmed that the transistor Tr1 is off, the value of the command to the transistor Tr2 is switched to ON, so as to turn on the transistor Tr2. After a predetermined period of time T4 [ms] has passed, the command value is switched to OFF, and the transistor Tr2 is turned off.

In the case where the transistor Tr1 has ON failure, even when the value of the command to the transistor Tr1 is changed to OFF after the predetermined period of time T4 [ms] has passed since the value of the command to the transistor Tr1 is switched to ON, the transistor Tr1 remains on, as shown in FIG. 22. Therefore, the value of the command to the transistor Tr2 is not switched to ON, and the OFF failure detection in the transistor Tr2 thereafter is aborted or stopped.

In the case where the transistor Tr2 has ON failure, before the OFF failure detection in the transistor Tr1 is performed, the transistor Tr2 is turned on, as shown in FIG. 23. Therefore, the value of the command to the transistor Tr1 is not switched to ON, and the OFF failure detection thereafter in the transistors Tr1 and Tr2 is aborted or stopped.

Fourth Embodiment

Figure 24:
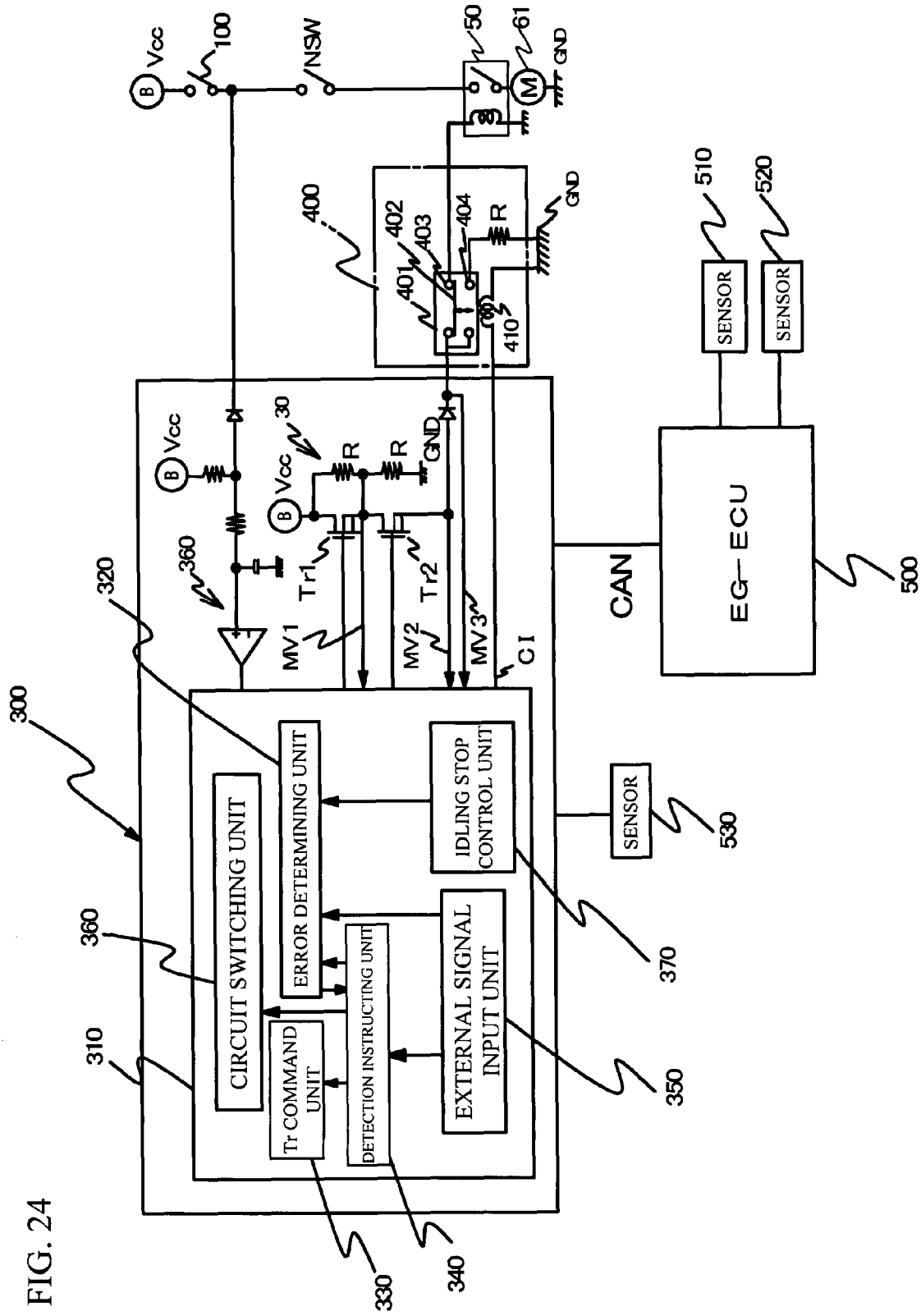
FIG. 24 shows the structure of an idling stop ECU in accordance with yet another embodiment of an engine start control device of the present invention.

FIG. 24 shows the structure of an idling stop ECU in accordance with yet another embodiment of an engine start control device of the present invention to be applied to the starter of an engine, and the peripheral components of the idling stop ECU. In FIG. 24, the same components as those shown in FIG. 9 are denoted by the same reference numerals as those in FIG. 9.

As shown in FIG. 24, this IS-ECU 300A includes a control processing unit 310A, a starter energizing circuit 30, and a NSW monitor 360. The IS-ECU 300A also has a switching circuit 400 provided outside.

The control processing unit 310A includes a circuit switching unit 360 and an idling stop control unit 360, as well as the components of the above described control processing unit 310.

The circuit switching unit 360 performs the later described circuit switching between the starter energizing circuit 30 and the starter relay 50, depending on whether failure detection is performed in the starter energizing circuit 30 or whether the transistors Tr1 and Tr2 are in an abnormal state.

The idling stop control unit 370 controls various idling stop modes.

The switching circuit 400 is provided between the starter energizing circuit 30 and the starter relay 50, and includes a relay switch 401 and an exciting coil 410.

The exciting coil 410 is excited by a current CI supplied from the IS-ECU 300A.

The relay switch 401 has a movable contact point 402 that is driven by the exciting coil 410. When the movable contact point 402 is connected to a fixed contact point 403 electrically connected to the relay coil 50, the starter energizing circuit 30 is connected to the relay coil 50. When the movable contact point 402 is connected to a fixed contact point 404 connected to the ground GND via a resistor R as a failure detecting circuit, the starter energizing circuit 30 is disconnected from the relay coil 50, and is connected to the resistor R as the failure detecting circuit. In other words, the switching circuit 400 functions as a circuit switching unit or a circuit disconnecting unit.

Figure 25:
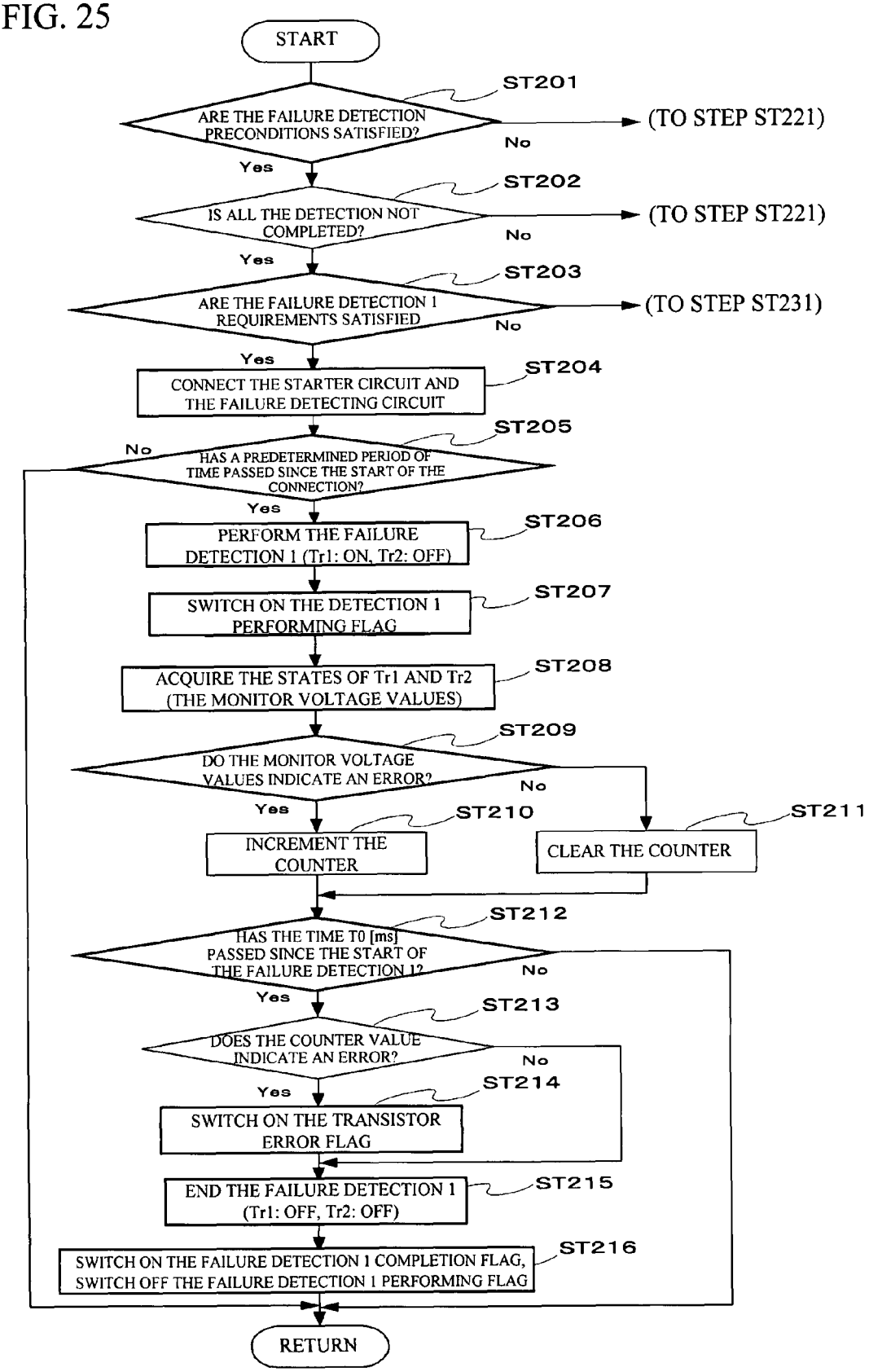
FIG. 25 is a flowchart showing a failure detecting operation to be performed by the control processing unit shown in FIG. 24.
Figure 26:
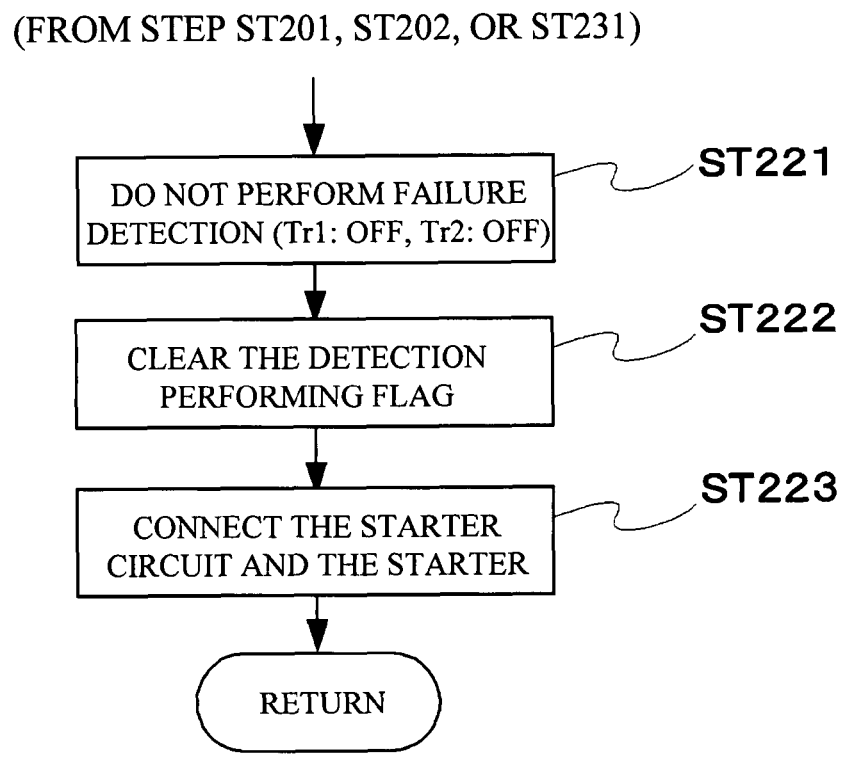
FIG. 26 is a flowchart showing an operation continuing from FIG. 25.
Figure 27:
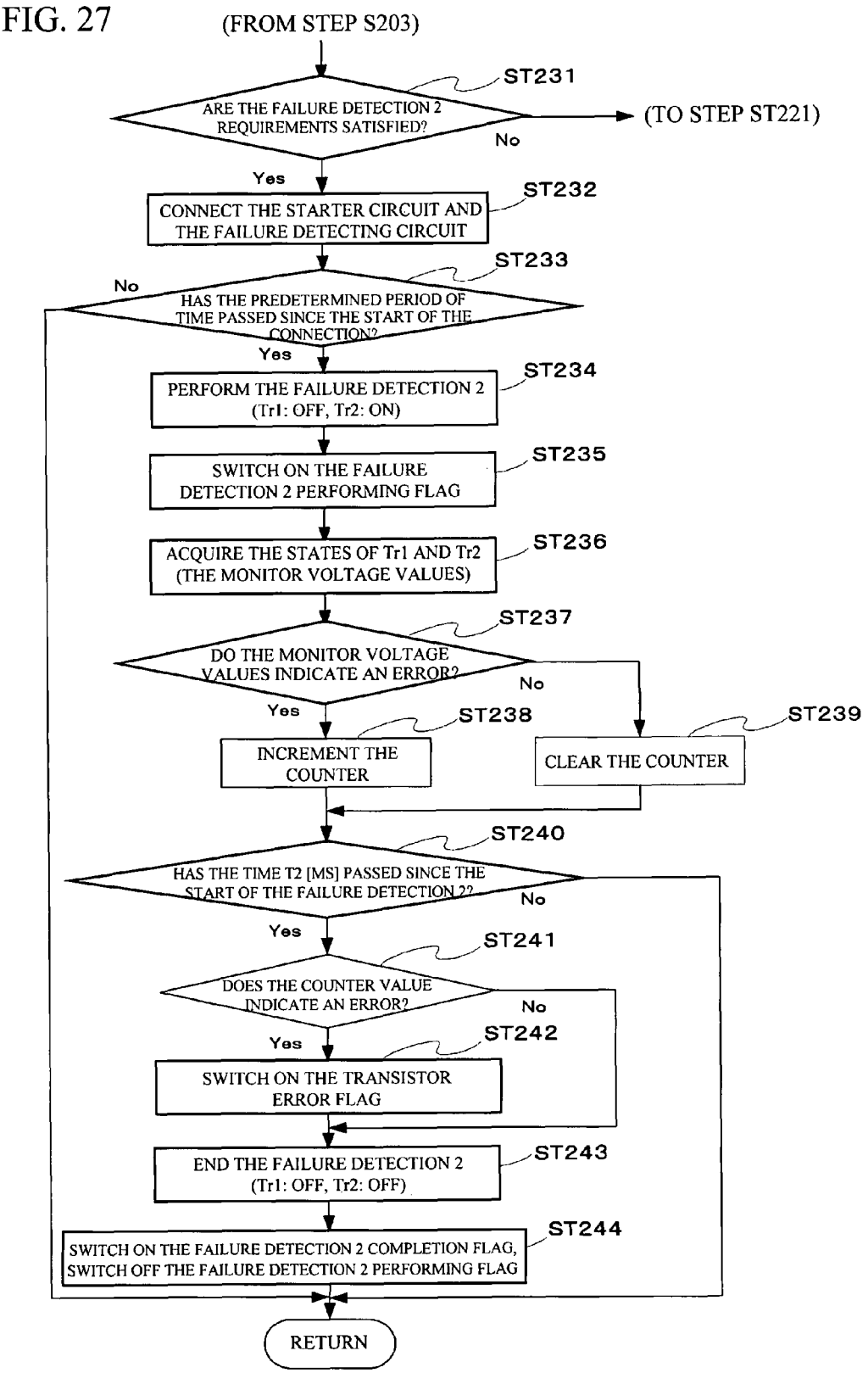
FIG. 27 is a flowchart showing an operation continuing from FIG. 25.

Referring now to the flowcharts shown in FIGS. 25 through 27, operations to be performed by the control processing unit 310A to check the transistors Tr1 and Tr2 are described. The operations shown in FIGS. 25 through 27 are performed at regular intervals.

First, as shown in FIG. 25, the control processing unit 310A determines whether the failure detection preconditions are satisfied (step ST201). The preconditions for starting failure detection are that the shift position is within the D range, there is not an error in the starter energizing circuit 30 (the transistors Tr1 and Tr2 do not have ON failure), there is not an error in the vehicle speed sensor 530, the vehicle speed is 20 km or higher, the throttle valve opening is 20% or higher, the CAN (communication) is in a normal state, the starter 60 (the starter motor 61) is not being driven, and the likes.

If the failure detection preconditions are not satisfied, the control processing unit 310A carries out a failure non-detecting procedure to issue OFF commands to the transistors Tr1 and Tr2 (step S221), as shown in FIG. 26. The control processing unit 310A then clears the detection performing flag (step ST222), and drives the switching circuit 400 so as to connect the starter circuit 30 and the starter motor 61 (step ST222).

If the failure detection preconditions are satisfied in step ST201, the control processing unit 310A determines whether the failure detection 1 (the OFF failure detection in the transistor Tr1) and the failure detection 2 (the OFF failure detection in the transistor Tr2) have been completed (step ST202), as shown in FIG. 25. This determination is carried out based on the states of the detection 1 completion flag and the detection 2 completion flag.

If the failure detection 1 and the failure detection 2 are both complete, the procedures of steps ST121, ST122, and ST123 shown in FIG. 26 are carried out.

The control processing unit 310A then determines whether the failure detection 1 requirement (the requirement for starting the failure detection 1) is satisfied (step ST203).

Here, the failure detection 1 requirement is that the failure detection 1 has not been performed.

If the requirement for starting the failure detection 1 is not satisfied, the control processing unit 310A performs the operation shown in FIG. 27 (an operation related to the failure detection 2), as will be described later.

If the requirement for starting the failure detection 1 is satisfied in step ST203, the control processing unit 310A drives the switching circuit 400 so as to disconnect the starter circuit 30 from the starter relay 50 and connect the starter circuit 30 to the resistor R (the ground GND) as a failure detecting circuit (step ST204).

In a case where a predetermined period of time has passed since the starter circuit 30 was connected to the failure detecting circuit (step ST205), the control processing unit 310A performs the failure detection 1 (the OFF failure detection in the transistor Tr1) (step ST206). The procedures of steps ST207 through ST216 to be carried out thereafter are the same as the procedures of steps ST106 through ST114 shown in FIG. 18, and therefore, explanation of them is omitted here.

If the failure detection 1 requirement is not satisfied in step ST203, the control processing unit 310A determines whether the failure detection 2 requirement is satisfied (step ST231), as shown in FIG. 17. Here, the failure detection 2 requirement is that the failure detection 2 has not been performed.

If the failure detection 2 requirement is not satisfied, steps ST231 through ST233 shown in FIG. 26 are carried out.

If the failure detection 2 requirement is satisfied, the control processing unit 310A performs the failure detection 2 (the OFF failure detection in the transistor Tr2) (step ST234). The procedures of steps ST235 through ST244 to be carried out thereafter are the same as the procedures of steps ST133 through ST142 shown in FIG. 20, and therefore, explanation of them is omitted here.

As described above, in accordance with this embodiment, when failure detection is performed in the transistors Tr1 and Tr2, the starter energizing circuit 30 is disconnected from the starter relay 50, so that the starter 60 is not inadvertently driven.

Fifth Embodiment

Figure 28:
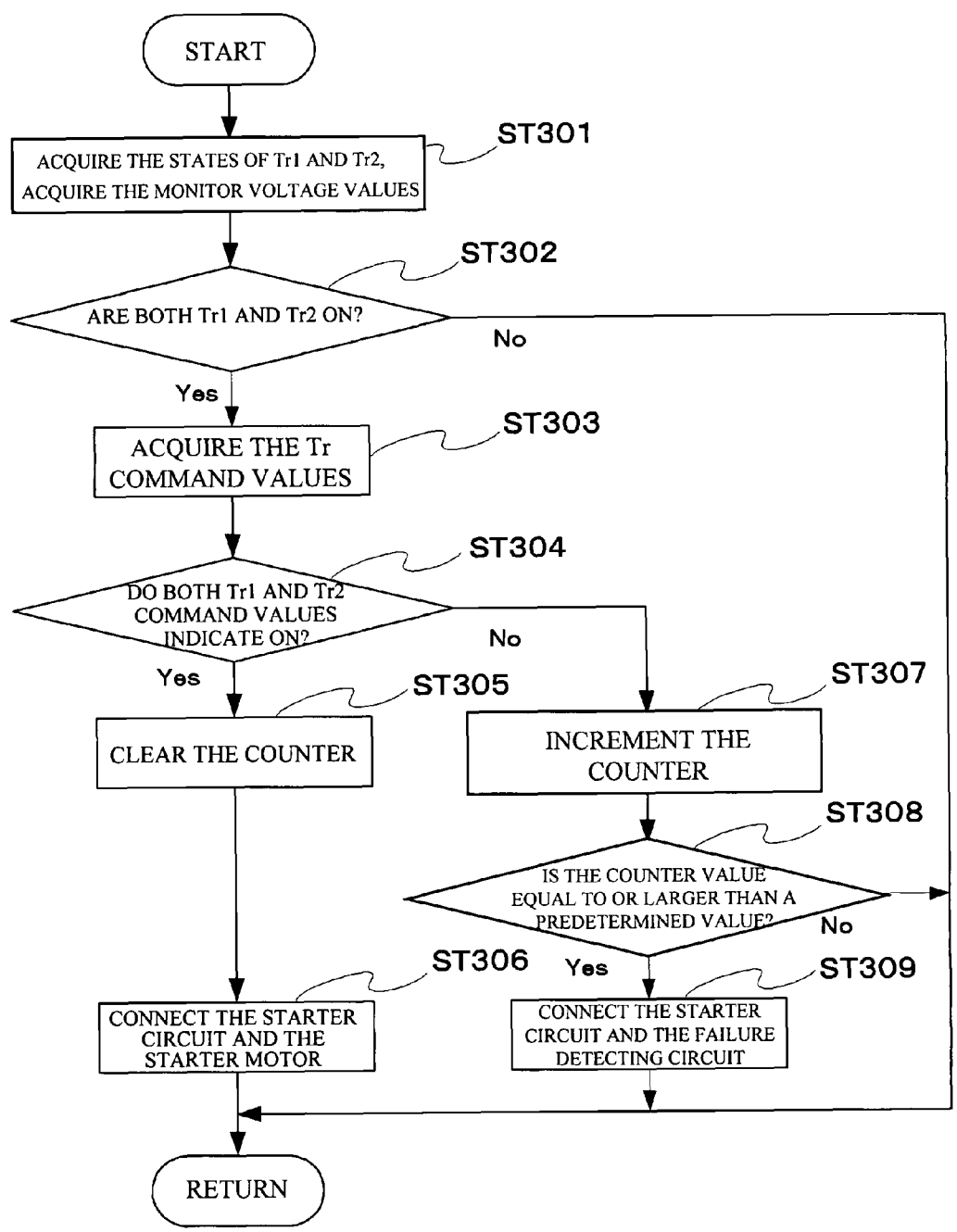
FIG. 28 is a flowchart showing an operation to be performed by the control processing unit shown in FIG. 24 when a transistor has failure.

Referring now to the flowchart shown in FIG. 28, an operation to be performed by the control processing unit 310A when failure is caused in the transistors Tr1 and Tr2 is described. The operation shown in FIG. 28 is performed at regular intervals, so as to constantly monitor transistor failure.

As shown in FIG. 28, the control processing unit 310A first acquires the states of the transistors Tr1 and Tr2 (the monitor voltage values MV1 and MV2) (step ST301). Based on the monitor voltage values MV1 and MV2, the control processing unit 310A determines whether the transistors Tr1 and Tr2 are both on (step ST302). If the transistors Tr1 and Tr2 are both on, the control processing unit 310A acquires the values of the commands to the transistors Tr1 and Tr2 (step ST303), and determines whether the commands are ON commands (step ST304). If the commands are ON commands, the transistors Tr1 and Tr2 are both in a normal state, and the control processing unit 310A clears the counter (step ST304). The control processing unit 310A then connects the starter circuit 30 and the starter relay 60 (step ST306).

If at least one of the commands issued to the transistors Tr1 and Tr2 is an OFF command though the transistors Tr1 and Tr2 are both on in step ST304, the control processing unit 310A determines that there is an error, and increments the counter (step ST307). When the value of the counter exceeds a predetermined value (step ST308), the control processing unit 310A determines that the transistors Tr1 and Tr2 have ON failure. The control processing unit 310A then disconnects the starter circuit 30 from the starter relay 60, and connects the starter circuit 30 to the failure detecting circuit (at the side of the resistor R) (step ST309). In this manner, even when the transistors Tr1 and Tr2 have ON failure, inadvertent driving of the starter 60 can be prevented.

Sixth Embodiment

Figure 29:
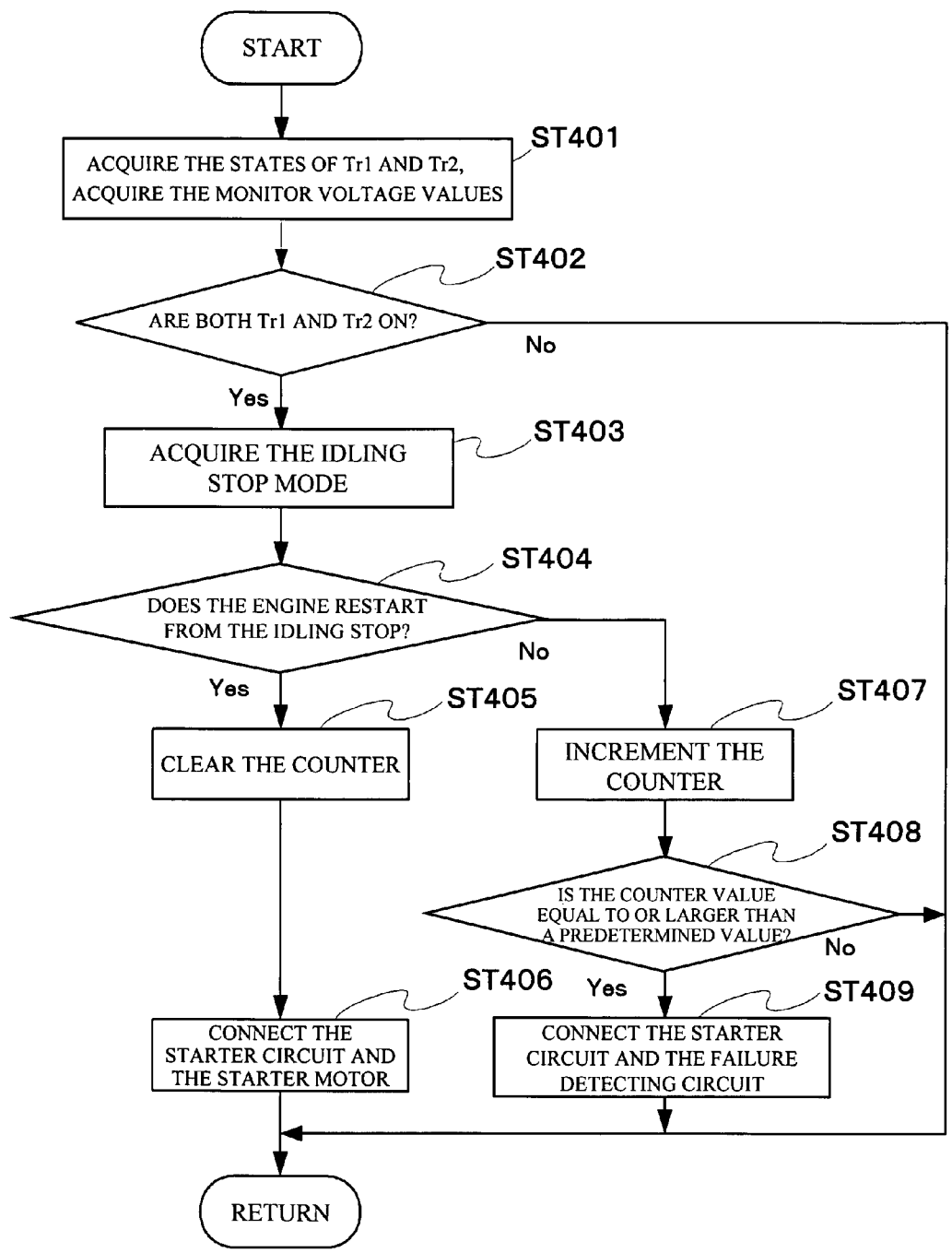
FIG. 29 is a flowchart showing another operation to be performed by the control processing unit shown in FIG. 24 when a transistor has failure.

Referring now to the flowchart shown in FIG. 29, an operation to be performed by the control processing unit 310A when failure is caused in the transistors Tr1 and Tr2 is described. The operation shown in FIG. 29 is performed at regular intervals, so as to constantly monitor transistor failure.

As shown in FIG. 29, the control processing unit 310A first acquires the states of the transistors Tr1 and Tr2 (the monitor voltage values MV1 and MV2) (step ST401). Based on the monitor voltage values MV1 and MV2, the control processing unit 310A determines whether the transistors Tr1 and Tr2 are both on (step ST402). If the transistors Tr1 and Tr2 are both on, the control processing unit 310A acquires an idling stop mode from the idling stop control unit 370, and determines whether to restart the engine from the idling stop state (step ST404). If the engine is to be restarted, the control processing unit 310A clears the counter (step ST405). The control processing unit 310A then connects the starter circuit 30 and the starter relay 60 (step ST406), so as to energize the starter relay 60 and drive the starter 60.

If the engine is determined not to be restarted from the idling stop state though the transistors Tr1 and Tr2 are both on in step ST404, the control processing unit 310A determines that the transistors Tr1 and Tr2 are in an abnormal state, and increments the counter value (step ST407). When the value of the counter exceeds a predetermined value (step ST408), the control processing unit 310A determines that the transistors Tr1 and Tr2 have ON failure. The control processing unit 310A then disconnects the starter circuit 30 from the starter relay 60, and connects the starter circuit 30 to the failure detecting circuit (at the side of the resistor R) (step ST409). In this manner, even when the transistors Tr1 and Tr2 have ON failure, inadvertent driving of the starter 60 can be prevented.

Although the switching unit is a transistor in the above described embodiments, the switching unit is not limited to that, and may be formed with a relay or the like.

Also, in the above described embodiments, two transistors are connected in series. However, the present invention may be applied to a case where three or more transistors are connected in series.

The above described embodiments are preferred embodiments of the present invention. However, the present invention is not limited to those embodiments, and various changes and modifications may be made to them, without departing from the scope of the invention.

The invention claimed is:

1. An engine start control device that automatically stops an engine of a vehicle when automatic stop requirements are satisfied while the engine is running, and automatically restarts the engine when automatic start requirements are satisfied while the engine is not running,
   the engine start control device comprising:
      a starter energizing circuit that is provided between a power supply and a starter relay for activating a starter of the engine, that includes at least two transistors connected in series, and that energizes the starter relay; and
      a failure detecting unit that drives each of the transistors to check for failure,
      the failure detecting unit:
         detecting failure in one of the transistors by prohibiting a drive of another of the transistors and driving or canceling the drive of the one of the transistors for a predetermined period of time,
         detecting failure in the other of the transistors by prohibiting the drive of the one of the transistors and driving or canceling the drive of the other of the transistors for the predetermined period of time, and
         aborting the failure detection when the failure in either one of the transistors is detected.

2. The engine start control device as claimed in claim 1, wherein the failure detecting unit aborts the failure detection when at least one of the transistors is in a conductive state.

3. The engine start control device as claimed in claim 1, wherein
   the failure detecting unit performs the failure detection in the transistors while the vehicle is running.

4. An engine start control device that automatically stops an engine when automatic stop requirements are satisfied while the engine is running, and automatically restarts the engine when automatic start requirements are satisfied while the engine is not running,
   the engine start control device comprising:
      a starter energizing circuit that is provided between a power supply and a starter relay for activating a starter of the engine, that includes at least two transistors connected in series, and that energizes the starter relay;
      a failure detecting unit that drives each of the transistors to check for failure;
      a failure detecting circuit that is allowed to have the starter energizing circuit connected thereto; and
      a switching circuit that selectively switches a connection destination of the starter energizing circuit between the starter relay and the failure detecting circuit,
      the switching circuit connecting the starter energizing circuit and the failure detecting circuit before failure detection is performed by the failure detecting unit,
      the failure detecting unit:
         detecting failure in one of the transistors by prohibiting a drive of another of the transistors and driving or canceling the drive of the one of the transistors for a predetermined period of time,
         detecting failure in the other of the transistors by prohibiting the drive of the one of the transistors and driving or canceling the drive of the other of the transistors for the predetermined period of time, and aborting the failure detection when the failure in either one of the transistors is detected.

5. The engine start control device as claimed in claim 4, wherein the failure detecting unit determines whether the two transistors have failed while controlling the switching circuit to connect the starter energizing circuit and the failure detecting circuit, the failure detecting unit controlling the switching circuit to reconnect the starter energizing circuit and the starter relay when failure is not found.

6. The engine start control device as claimed in claim 4, wherein the failure detecting unit controls the switching circuit to connect the starter energizing circuit and the failure detecting circuit, when determining that the starter relay is energized from the starter energizing circuit, while the two transistors are not being checked.

7. The engine start control device as claimed in claim 4, wherein:
the failure detecting circuit includes a switching element that opens and closes a path connecting the switching circuit to a ground; and
the failure detecting unit opens the switching element to shut off the path, when failure is found while the switching element is closed.

8. An engine start control device that automatically stops an engine when automatic stop requirements are satisfied while the engine is running, and automatically restarts the engine when automatic start requirements are satisfied while the engine is not running,
the engine start control device comprising:
a starter energizing circuit that is provided between a power supply and a starter relay for activating a starter of the engine, that includes at least two transistors connected in series, and that energizes the starter relay;
a transistor state detecting unit that detects states of the transistors;
a circuit disconnecting unit that disconnects the starter energizing circuit from the starter relay when the detected states of the transistors indicate an abnormal state; and
a failure detecting unit that, in a case where the detected states of the transistors indicate a normal state:
detects failure in one of the transistors by prohibiting a drive of another of the transistors and drives or cancels the drive of the one of the transistors for a predetermined period of time,
detects failure in the other of the transistors by prohibiting the drive of the one of the transistors and drives or cancels the drive of the other of the transistors for the predetermined period of time, and
aborts the failure detection when the failure in either one of the transistors is detected.

9. An engine start control device that automatically stops an engine when automatic stop requirements are satisfied while the engine is running, and automatically restarts the engine when automatic start requirements are satisfied while the engine is not running,
the engine start control device comprising:
a starter energizing circuit that is provided between a power supply and a starter relay for activating a starter of the engine, that includes at least two transistors connected in series, and that energizes the starter relay; and
a failure detecting unit that drives each of the transistors to check for failure,
the failure detecting unit performing OFF failure detection and ON failure detection in one of the transistors by prohibiting a drive of another of the transistors and driving or canceling the drive of the one of the transistors for a predetermined period of time, the drive of the other of the transistors being prohibited while checking the one of the transistors for ON failure, and the failure detecting unit aborting the failure detection when failure is found.

10. The engine start control device as claimed in claim 9, wherein the failure detecting unit maintains one of the transistors in an ON prohibited state, while checking the other one of the transistors for OFF failure.

11. The engine start control device as claimed in claim 9, wherein the failure detecting unit maintains both of the transistors in an ON prohibited state, while checking one of the transistors for ON failure.

12. The engine start control device as claimed in claim 9, wherein the failure detecting unit puts one of the transistors in an ON prohibited state and aborts the failure detection, when ON failure is found in the other one of the transistors.

13. An engine start control method for automatically stopping an engine when automatic stop requirements are satisfied while the engine is running, and automatically restarting the engine when automatic start requirements are satisfied while the engine is not running,
the engine start control method comprising:
checking a starter energizing circuit that is provided between a power supply and a starter relay for activating a starter of the engine, that includes at least two transistors connected in series, and that energizes the starter relay,
wherein, in the checking step, OFF failure detection and ON failure detection in one of the transistors are performed by prohibiting a drive of another of the transistors and driving or canceling the drive of the one of the transistors for a predetermined period of time, the drive of the other of the transistors is prohibited while checking the one of the transistors for ON failure, and the failure detection is aborted when the failure in either one of the transistors is detected.

14. An engine start control method for automatically stopping an engine when automatic stop requirements are satisfied while the engine is running, and automatically restarting the engine when automatic start requirements are satisfied while the engine is not running,
the engine start control method comprising the steps of:
energizing a starter relay by a starter energizing circuit that is provided between a power supply and the starter relay for activating a starter of the engine and that includes at least two transistors connected in series;
detecting a state of each of the at least two transistors; and
driving each of the at least two transistors to check for failure after detecting the state of each of the at least two transistors if the state of one of the at least two transistors is not abnormal,
wherein, in the driving step, checking failure in one of the transistors is performed by prohibiting a drive of another of the transistors and driving or canceling the drive of the one of the transistors for a predetermined period of time, and checking failure in the another of the transistors is performed by prohibiting the drive of the one of the transistors and driving or canceling the drive of the other of the transistors for the predetermined period of time.

* * * * *